(12) United States Patent
Blagg et al.

(10) Patent No.: US 7,340,423 B1
(45) Date of Patent: Mar. 4, 2008

(54) METHOD FOR DEFINING A RELATIONSHIP BETWEEN AN ACCOUNT AND A GROUP

(75) Inventors: Lynn Holm Blagg, Omaha, NE (US); Darren D. Beck, Gretna, NE (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 09/298,521

(22) Filed: Apr. 23, 1999

Related U.S. Application Data

(60) Provisional application No. 60/083,004, filed on Apr. 24, 1998.

(51) Int. Cl.
*G06Q 40/00* (2006.01)

(52) U.S. Cl. .......................... 705/35; 705/39; 705/40; 705/42

(58) Field of Classification Search .......... 705/35–42
See application file for complete search history.

(56) References Cited

U.S. PATENT DOCUMENTS

| | | | |
|---|---|---|---|
| 4,256,955 A | 3/1981 | Giraud et al. | |
| 4,321,672 A | 3/1982 | Braun et al. | |
| 4,700,055 A | * 10/1987 | Kashkashian, Jr. | 235/379 |
| 4,837,422 A | * 6/1989 | Dethloff et al. | 235/380 |
| 4,900,903 A | 2/1990 | Wright et al. | |
| 5,155,342 A | 10/1992 | Urano | |
| 5,231,569 A | 7/1993 | Myatt et al. | |
| 5,483,445 A | 1/1996 | Pickering | |
| 5,500,513 A | 3/1996 | Langhans et al. | |
| 5,513,102 A | 4/1996 | Auriemma | |
| 5,537,314 A | * 7/1996 | Kanter | 705/14 |
| 5,613,012 A | 3/1997 | Hoffman et al. | |
| 5,614,703 A | 3/1997 | Martin et al. | |
| 5,621,640 A | 4/1997 | Burke | |
| 5,684,965 A | 11/1997 | Pickering | |
| 5,770,843 A | * 6/1998 | Rose et al. | 235/380 |
| 5,826,243 A | * 10/1998 | Musmanno et al. | 705/35 |
| 5,859,419 A | 1/1999 | Wynn | |
| 5,864,830 A | 1/1999 | Armetta et al. | |
| 5,914,472 A | * 6/1999 | Foladare et al. | 235/280 |

(Continued)

FOREIGN PATENT DOCUMENTS

EP    0 540 234 A2    10/1992

(Continued)

OTHER PUBLICATIONS

Air Miles Reward Program; "Terms and Conditions of the Air Miles Reward Program"; May 1998.

*Primary Examiner*—Alain L. Bashore
(74) *Attorney, Agent, or Firm*—Townsend and Townsend and Crew LLP

(57) ABSTRACT

Defining a relationship between an account and a group. Accounts corresponding to different products are linked together to create a group so that group processing can be performed at the group level while independent processing of the accounts is performed at the account level. The relationship between a dependent account and the group is specified by a dependent strategy. A dependent strategy specifies group level processing options for the account. The relationships between the accounts and the group are flexible to accommodate changes in the status of the group cardholders.

22 Claims, 13 Drawing Sheets

U.S. PATENT DOCUMENTS

| | | | |
|---|---|---|---|
| 5,953,710 A * | 9/1999 | Fleming | 705/38 |
| 5,970,480 A * | 10/1999 | Kalina | 705/26 |
| 5,978,780 A | 11/1999 | Watson | |
| 5,999,596 A | 12/1999 | Walker et al. | |
| 6,021,943 A * | 2/2000 | Chastain | 235/379 |
| 6,044,360 A | 3/2000 | Picciallo | |
| 6,049,782 A * | 4/2000 | Gottesman et al. | 705/39 |
| 6,108,641 A | 8/2000 | Kenna et al. | |
| 6,128,599 A * | 10/2000 | Walker et al. | 705/14 |
| 6,128,602 A | 10/2000 | Northington et al. | |
| 6,128,603 A | 10/2000 | Dent et al. | |
| 6,226,623 B1 | 5/2001 | Schein et al. | |
| 6,304,860 B1 | 10/2001 | Martin, Jr. et al. | |
| 6,311,170 B1 * | 10/2001 | Embrey | 705/40 |
| 6,422,462 B1 * | 7/2002 | Cohen | 235/381 |

FOREIGN PATENT DOCUMENTS

| | | |
|---|---|---|
| EP | 0 725 376 A2 | 1/1996 |
| WO | 97/43893 | 11/1997 |

\* cited by examiner

METHOD FOR DEFINING A RELATIONSHIP BETWEEN AN ACCOUNT AND A GROUP

RELATED APPLICATIONS

This U.S. patent application relates to U.S. Provisional Patent Application Ser. No. 60/083,004 entitled "Methods and System for a Family Financial Services Card," filed Apr. 24, 1998. The present application and the related U.S. provisional patent application are commonly assigned to First Data Corporation.

This U.S. patent application also relates to U.S. patent application Ser. No. 09/298,505, Issued U.S. Pat. No. 7,050,996 issued May 23, 2006 entitled "Method for Linking Accounts Corresponding to Different Products Together to Create a Group," filed concurrently herewith and U.S. patent application Ser. No. 09/298,417, Issued U.S. Pat. No. 7,076,465 issued Jul. 11, 2006 entitled "Methods for Processing a Group of Accounts Corresponding to Different Products," filed concurrently herewith. The present application and the related applications are commonly assigned to First Data Corporation.

TECHNICAL FIELD

This invention relates in general to a method for defining a relationship between an account and a group, and more particularly to defining a flexible relationship between an account and a group that supports group processing at the group level while retaining independent processing of the account at the account level.

BACKGROUND OF THE INVENTION

Many individuals hold more than one credit card. Additionally, an individual may hold the liable relationship for more than one credit card held by another individual or individuals. There are several types of credit card products available. Some cards are private label cards that can only be used in a particular store or business, such as a department store card or a specialty chain store card. Other cards are general use cards that can be used in a variety of stores or businesses, such as a VISA, MASTERCARD, AMERICAN EXPRESS, DINER'S CLUB or DISCOVER card.

Cards held by an individual often include a variety of these different products and versions of these products. Different versions of a product are offered to address different market interests and needs. For example, a VISA card could be a classic card, a gold card, or a co-branded card. Issuers often encourage their existing cardholders to carry more than one of their products to increase the share of that consumer's activity for their products.

A consumer can be encouraged to hold multiple products and/or cards for any of a number of reasons. The number and type of cards held by an individual are influenced by many factors, including interest rate, reward program and merchant acceptance. The activity on the various accounts held by an individual may vary due to the type of expenditure or the person making the purchase.

Different cards can be used by a single consumer to manage different types of expenditures. For example, one card can be used for everyday household expenditures, such as groceries and gasoline, another card can be used for major household expenditures, such as major appliances or furniture, and yet another card can be used for vacation expenditures.

Many credit card products offer a reward program to provide an incentive for a cardholder to use the card associated with the program. An individual often carries different cards to participate in a variety of different reward programs. A typical reward program awards points based upon the amount and/or type of purchases made with the card. Depending on the purchase, an individual may select the card with the greatest reward opportunity associated with that particular purchase.

In addition to carrying multiple cards as an individual, an individual can share ownership of credit products carried by other members of their family. For example, in a family including a mother, a father, a daughter and a son, each parent can hold a number of cards. In addition to the parents, the children can also hold cards. Some of the cards can be held individually and some can be held jointly. To help manage the family finances, it would be beneficial if information about all of the cards held by members of the family could be collected in a single statement.

If the members of a family hold distinct accounts, the reward points earned by the family members are generally divided among different reward programs and/or different accounts. An issuer may find a marketing advantage if the accounts could be pooled together, making it easier for the members of the family to reach a point goal. Thus, there is a need for pooling reward points earned by different individuals using different accounts.

Depending upon the age and status of the children, the mother and/or the father is liable for any charges incurred by the son or daughter. Typically, if a parent wants to provide a child with a credit card, the parent has three options: 1) provide the child with an additional card on an existing account, 2) provide the child with a card on an account where the child is the primary user and the parent is the responsible party, or 3) provide the child with a secured card by providing collateral for the account.

Each of the current options has disadvantages. A disadvantage of providing the child with an additional card on an existing account is that the child has access to the entire credit line of the account. A disadvantage of providing the child with a card on an account where the child is the primary user and the parent is the responsible party is that the parent's access to credit may be reduced. If the parent also has another account, then the credit line given to the child is not available to the parent even if the child is not currently using it because the accounts are unrelated. A disadvantage of providing the child with a secured card by providing collateral for the account is that the collateral is committed to secure the account regardless of the amount of activity on the account. A secured account also may not include a process to report activity to the parent providing the collateral. Thus, there is a need for additional options for an individual to provide a child with a credit card. In particular, there is a need for limiting a child's access to a shared credit line and for considering multiple accounts when calculating an individual's available credit.

As a result of these market realities, issuers are faced with a challenge to manage an individual's whole relationship with them while offering the flexibility consumers desire in their product options. Issuers want a complete answer to manage an individual as a relationship and to maintain control and marketing data at the lowest possible level. The lowest level being a single person using a single product version. Currently, several solutions exist which answer varying components of the problem. Additional names, commercial card functions, data stores, plastic/account separation, and other off-line processing all provide only partial solutions.

Some credit card issuers facilitate group processing by maintaining additional names on an account. This basic functionality identifies multiple cardholders as authorized users on the same financial record. In addition to the issues of shared credit lines discussed above, this functionality requires that all cardholders share the same credit product and product version. This option also provides almost no functionality at the cardholder level. All activity is maintained and managed at the account level which merges the individual cardholders together. This limits the issuer's ability to complete marketing analysis on individual group members.

As an extension of the additional names functionality, some processing systems allow the cards which correspond to the additional names to have distinct card numbers. Financial calculations on these accounts are still done at the account level, but the individual transaction activity can be tracked back to a particular cardholder. This functionality does not solve the shared credit issues or the ability to make other processing decisions at the card level.

Some credit card issuers provide commercial card accounts. A commercial card account is a single financial account that is associated with multiple cards. All of the cards are the same type and version of a product, e.g. a standard VISA card. Each of the cards can have a different card number. The different card numbers can be used to list the transactions by cardholder on the statement. A single group statement is sent to the financially responsible party, usually the company.

In most applications of commercial card functionality, the sub-accounts are actually contained on a distinct financial record, but the record is only a shell of information. The true financial activity is transferred to the group or lead account. This functionality does not accommodate different types or versions of credit card products. Although several authorization options exist, the restrictions are based on monthly spending limits rather than a true available credit. This is because outstanding balances are not monitored at the individual card level. Commercial cards also do not accommodate different types of cardholder relationships to the group. An employee card is either paid for by the employee or by the company. A family or household scenario requires a greater variation of communication and liability options. A family scenario also requires that an account can become independent of the group or other existing accounts can be added to the group.

If a child can qualify for a credit card individually, then the child can be the responsible party or a jointly liable party for the account. For example, a child can qualify for a credit card individually if the child is a college or university student. Even if a child can qualify for a credit card individually, an individual, such as a parent, may want to monitor the activity of the account to help the child manage the child's credit. Thus, there is a need for providing courtesy copies of account activity to an individual, such as a parent.

An individual's credit needs change over time because the financial ability of the individual, as well as the financial maturity of the individual change. For example, at one point, a child may not be able to qualify individually for a credit card and may need an individual, such as a parent to be the financially responsible party for the card. At another point, the child may be able to qualify individually for a credit card, but may benefit from some assistance or supervision from a parent. At yet another point, the child may be able to qualify individually for a credit card and to manage the account without assistance. Often times an individual uses different credit card accounts to meet the individual's different needs. However, it would be simpler if a single credit card account could adapt to meet the different credit needs of an individual by accommodating different types of cardholder relationships.

Some issuers manage distinct accounts at the lowest level then depend on outside data stores to integrate group data into the management of the accounts. Outside data stores are data query systems which are maintained outside the core processing system. They are often tied into operations centers for informational look-up processing. The data stores are maintained by loading data from the core processing system. Issuers populate data stores and load "keys" onto account records to link accounts. These links allow customer service personnel and collectors to recognize individuals who hold multiple accounts. Data related to the various accounts can be displayed for use in manual service activity. This type of functionality is not integrated into automatic processing functions. In many cases, the operator would have to take further action to define the relationship the linked accounts have to one another. The card may or may not be held by the same individual or the accounts may not have the same jointly liable relationship to a second person. Thus, there is a need to integrate group processing into the automatic functions of a processing system to avoid the expense and issues of manual intervention.

Some issuers use these same off-line data stores to process scoring engines. The scoring engines allow numeric values to be assigned to accounts which could allow the existence of other accounts held by the same individual to impact the processing of the first account. This process can be automatic but it assumes a generally static relationship. Typically, this type of functionality does not provide an easy audit trail to find the accounts which were included in the scoring activity. In addition, the processing activity remains at the account level rather than the group level. Credit lines, statements, and correspondence are not managed at the group level.

Some issuers attempt to manage some of these issues by distinguishing distinct balances on a single financial record. This processing is referred to as transaction processing. Transaction processing allows a sub-record within the financial processing of an account. One balance can apply to one set of pricing controls, but not for distinct authorizations, ownership, or delinquency management. The payoff of these balances can be controlled, but the delinquency is the delinquency of the account as a whole. This functionality also does not allow management of distinct owners.

Some issuers address these challenges with off-line or manual processes. For example, a jointly held account for a college age child may carry the child's mailing address and both the child and the parent's name. However, if the account becomes delinquent, off-line files are used to find the parent's address and manual collection efforts are made toward the parent. In some cases, this might be the first notice to the parent of the delinquent state of the account.

Accordingly, there is a need in the art for a method for linking one or more accounts together to form a group to support integrated group level processing while maintaining individual processing to the accounts. Preferably, the accounts of the group can span multiple products and the relationship of each account to the group is flexible and independent of the other accounts in the group.

SUMMARY OF THE INVENTION

The present invention meets the needs described above by providing a method for linking accounts corresponding to different products together to create a group so that group processing can be performed at the group level while independent processing of the accounts is performed at the account level. A group includes a number of accounts that correspond to a single issuer. The accounts can span multiple products so that an account corresponding to a VISA product can be in the same group as an account corresponding to a MASTERCARD product. Each group has a primary owner. A primary owner is the intended recipient of group correspondence and the primarily liable party of any group liability. Generally, the primary owner corresponds to a cardholder for a key account. However, a key account is not required. All non-key accounts in the group are dependent accounts. A dependent account may or may not be included in the group liability.

Linking the accounts into a group is accomplished by linking the financial record that corresponds to each account to the group master data for the group. A key financial record corresponds to the primary owner and the key account (if any). A dependent financial record corresponds to each of the dependent accounts. Dependent accounts include all non-key group members regardless of the relationship the account has to the group. The group master data includes information about the group, including control settings, aggregate data, and a group identifier. The membership to the group is maintained within the group data and on each member financial record.

The relationship between the financial record and the group defines the processing impacts of membership to the group on the individual financial record. The relationship of the key account to the group is that of primary owner. A majority of the processing impacts of that relationship are typically predefined by the card processing and service provider. The relationship of a dependent account to the group is defined by a set of processing options. These processing options are defined as a dependent strategy. A dependent strategy specifies the impact of group level processing on the processing of the dependent account. Typically, the dependent strategy includes parameters that define how and when group membership impacts transaction authorizations, group payment applications, as well as whether payment for the account balance is due from the primary owner or from the dependent cardholder. In addition, the dependent strategy includes options for statement generation, cardholder communications, and reward pooling.

The relationship between each account in the group is flexible and can be modified. A group can contain some dependent accounts which process as completely subordinate accounts with no direct communication to the dependent cardholder and other dependent accounts which process as secondary or joint owners of the group with full disclosure of all group activity. Each defined dependent strategy can be used to define the relationship of any number of accounts to any number of groups. Also, each group can include dependent accounts with relationships defined by any number of different strategies. Additionally, an existing relationship between a given dependent account and a group can be changed from one strategy to another strategy. The ability to modify the dependent strategy allows the account processing to change as the cardholder's situation changes. Changing the dependent strategy of one of the dependent accounts does not impact the dependent strategies of the other dependent accounts.

The relationship of the primary owner can also be changed. A key account can be modified to be a dependent account or removed completely from the group. This action is allowed as long as a new primary owner or key account is identified (if one is required). A dependent account can be "matured" into a key account. To mature a dependent account into a key account, the relationship parameter for the dependent account is changed from dependent to key and the relationship parameter for the current key account is changed to dependent.

There are a number of ways that a group can be created. One way to create a group is to create a number of new accounts and link the new accounts together. Another way of creating a group is to link a number of existing accounts together. The group data is automatically generated when the first member of the group is identified. Once a group is created, additional accounts can be added to the group or existing accounts can be removed from the group.

A dependent account can be added to the group or removed from the group without affecting the remaining accounts in the group. The ability to add dependent accounts and delete dependent accounts allows the group to change to accommodate changes in the relationships between the primary owner and the dependent cardholders. For example, the dependent cardholder may be a minor child of the parent who is the primary owner. Initially, all disclosures and liability is held by the parent and therefore communications are sent to the parent. Later the child may become a college student with joint liability for the account and responsibility for the monthly payments. At this time the parent is receiving courtesy disclosures. The processing for the child's account can change with the relationship by changing the dependent strategy.

To add a dependent account to a group, the dependent financial record for the dependent account is linked to the group master data. The link is stored in the group master data and on the dependent financial record. These two records are compared daily to ensure that no out-of-sync condition has occurred. The history which accrued on an account prior to joining a group will remain intact after it is linked into the group.

To remove a dependent account from the group, the dependent financial record for the dependent account is delinked from the group master data. The history which accrued during the period that an account was a member of the group also remains intact when the account is delinked. Removing a dependent account from a group may correspond to a change in family status. If an account is removed from a group, it can be moved to an existing group, used to create a new group, or can be designated as an independent account that is not a member of a group.

If all the accounts associated with a group are removed from the group, then the group continues to exist for some pre-defined period of time even though the group does not have any members. The group continues to exist so that audit history for the group can be maintained for the pre-defined period of time.

Once a group is created it can be used to perform group processing. Group processing typically includes authorizing transactions, applying group payments, creating group statements, controlling cardholder communications, and administering reward programs for the accounts in the group.

Group authorizations allow issuers to set a group credit line and manage the group available credit across all participating group members. All authorization controls and limits are calculated using the group credit line and available credit. Monetary activity from any participating group member may increase or decrease the group available credit. The key account always participates in authorizations at the group level. The dependent accounts in the group participate in the group authorizations as an option. In one aspect of the invention, the dependent strategy includes three authorization options for a dependent account. One authorization option considers only the credit line and available credit of the group, a second option considers only the credit line and available credit of the dependent account, and a third option considers the credit line and available credit of both the group and the dependent account. This function differs from the prior art in that the individual available credit is calculated against maintained balances by maintaining monetary history on the individual account. In the prior art applications, the individual member does not have a maintained balance over time. Monetary balances are transferred to an owner account and the individual line is refreshed. In this type of application, the individual is authorizing against a monthly spending limit rather than a true credit line.

Group balances including minimum payments due ("MPD") and outstanding balances are calculated and stored in the group master data. These amounts are then reported to the primary owner. The key account is always included in these calculations. The dependent accounts in a group are included in the calculation as an option. In one aspect of the invention, the dependent strategy defines the responsible party for the payments on that account. One option requires the payment of the dependent account balance to be due from the primary owner, and a second option requires the payment of the dependent account balance to be due from the dependent cardholder.

Group processing includes the ability to process payments or credits received at the group level. Once recognized as a group payment, the credit is allocated across all participating accounts in the group. An account participates in the allocation of credit depending on how it was included in the group MPD and outstanding balance during the last statement processing and the applicable group control settings. Alternatively, the payment may be allocated manually across the accounts in the group based on issuer policy or cardholder direction. In one aspect of the invention, the allocation of a group payment is determined by a combination of the group payment amount, the stored group balances, the stored individual balances which correspond to the group balances, and group control settings which determine which balances to use. In this aspect, percentages are used to determine the value of each account's allocation. Payment is allocated to accounts based on that account's share of each type of group balance in the order that the balances are defined by the group controls.

A group statement is created for the group and is sent to the primary owner. The group statement includes information about the activity of the key account (if any) and the activity of the dependent accounts of the group. The amount of information that appears on the group statement about a dependent account is controlled by the dependent strategy. Depending upon the dependent strategy, the group statement includes details of the activity of the dependent account or a summary of the activity of the dependent account. If the dependent strategy specifies that payment for the dependent account is due from the group, then the strategy also specifies whether a courtesy statement is sent to the dependent cardholder.

Group processing can impact the intended recipient and content of other cardholder communications. In addition to statements, several communications are typically generated for an account. If the account generating the activity is a dependent account, the correspondence can be redirected to the primary owner of the group. In one aspect of the invention, a series of options on the dependent strategy define the addressee or the intended recipient of an original communication, such as a letter, a notice or a new plastic. The intended recipient can be either the primary owner or the dependent cardholder. In the case of letters and notices, the options also includes the ability to generate a courtesy copy of the communication for the party who did not receive the original. If multiple letters are redirected to the primary owner, those letters can be merged into a single letter including the variable content from the various group member accounts.

Group processing also includes options for pooling and redeeming reward points. A parameter included in the definition of a particular reward program indicates whether the program supports reward point pooling. If the program supports pooling, then any reward points for that program which are earned by the key account (if any) are pooled into a group pool. The primary owner is permitted to redeem group reward points. The dependent strategy specifies whether reward points earned by a dependent account are pooled or are maintained at the account level. The dependent strategy also specifies whether the dependent account cardholder can redeem group reward points. The group pool is independent of any member account. Accounts can be delinked from the group without impacting the group accumulation.

Group non-monetary transactions support group level processing by updating multiple accounts within a group. A non-monetary transaction is a transaction that affects information for one or more accounts within the group, but does not affect the monetary information for the account. For example, a change in billing address is a non-monetary transaction. A group non-monetary transaction can be used to update all of the accounts in the group while only requiring that the updated information be entered once. To update the accounts in a group with updated group information, the accounts within the group are identified by the processing system using the group data. Once the financial records are identified, the operator is given an option to update all or only selected records, and then the financial records are updated with the updated information.

These and other objects, features, and advantages of the present invention may be more clearly understood and appreciated from a review of the following detailed description and by reference to the appended drawings and claims.

DETAILED DESCRIPTION OF THE INVENTION

Figure 1:
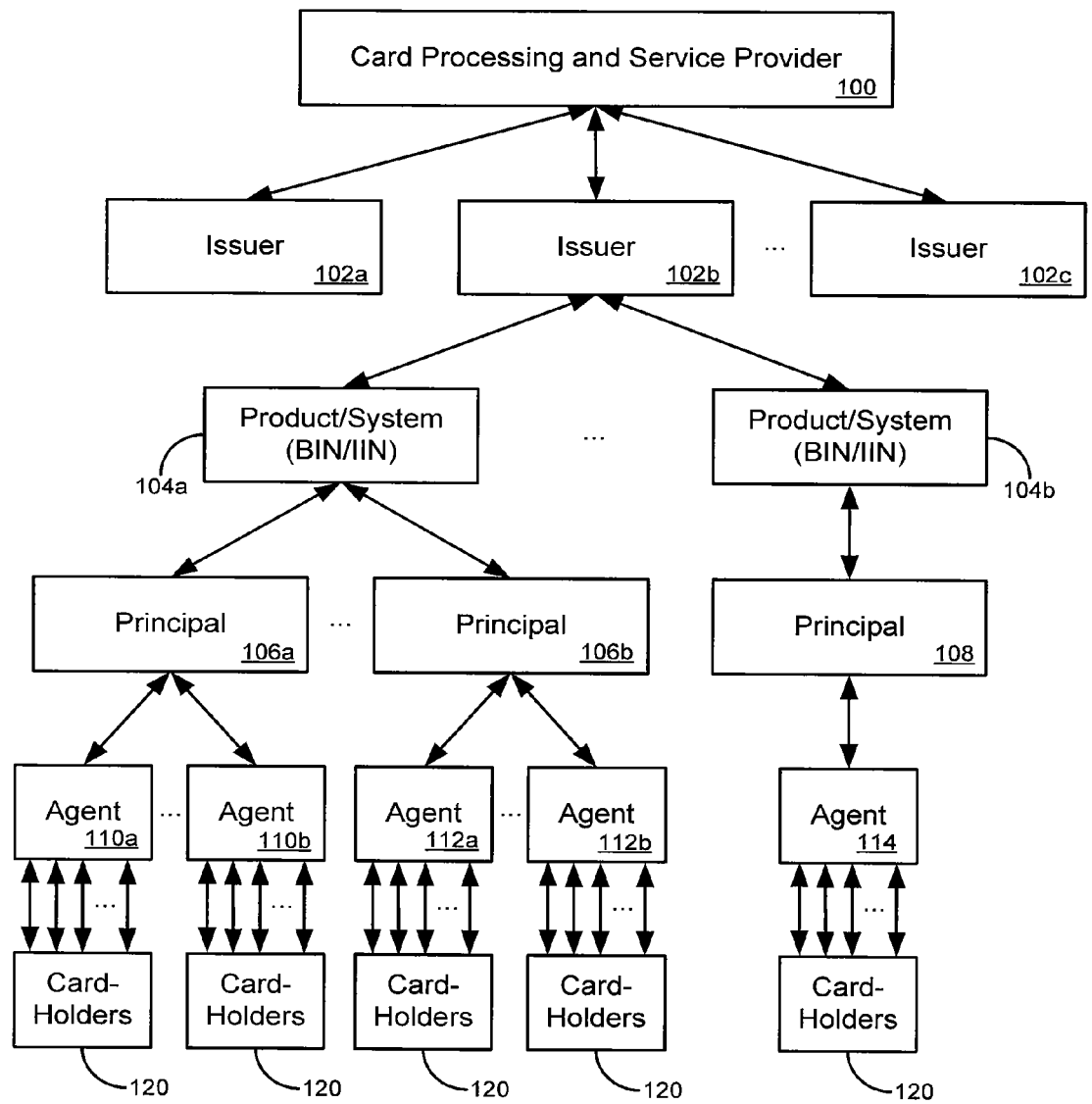
FIG. 1 is a block diagram illustrating an exemplary relationship between a card processing and service provider, issuers and cardholders.

The present invention is directed to a method for linking accounts corresponding to different products together to create a group so that group processing can be performed at the group level while independent processing of the accounts is performed at the account level. The accounts in a group can span multiple products. A typical group includes a key account and one or more dependent accounts. Each group has a primary owner. Generally the primary owner corresponds to a cardholder for the key account.

Briefly described, the method links the accounts into a group by linking a financial record for each account to group master data for the group. The group master data includes information about the group and the group members, including group control settings, group aggregate data, and a group identifier. The financial records include information about the corresponding account, a relationship parameter specifying whether the corresponding account is a key account or a dependent account, and if the financial record corresponds to a dependent account, a dependent strategy identifier.

The relationship between a dependent account and the group is specified by a dependent strategy. A dependent strategy specifies group processing options for the dependent account. The relationship between a dependent account and the group can be changed by selecting a new dependent strategy.

The detailed description which follows is represented largely in terms of processes and symbolic representations of operations by a conventional computer. The processes and operations performed by the computer, in both a stand-alone environment and a distributed computing environment, include the manipulation of signals by a processor and the maintenance of these signals within a data set, such as a database and a data structure. Each of these data sets and data structures are resident in one or more memory storage devices. Basically, a data set is a collection of related information in separate elements that are manipulated as a unit. A data structure is a structured organizational scheme that encapsulates data in order to support data interpretation and data operations. The data structure imposes a physical organization upon the collection of data stored within a memory storage device and represents specific electrical or magnetic elements.

For the purposes of this discussion, a method or process is generally conceived to be a sequence of computer-executed steps leading to a desired result. These steps generally require physical manipulations of physical quantities. In addition, it should be understood that the methods and systems described herein are not related or limited to any particular computer (standalone or distributed) or apparatus. Furthermore, the methods and systems are not related or limited to any particular communication architecture. Thus, one skilled in the art will be able to implement the systems and methods of the present invention with general purpose machines or specially customized programmable devices according to the teachings described herein.

Referring now to the drawings, in which like numerals represent like elements throughout the several figures, aspects of the present invention and the preferred operating environment are described.

Card Processing and Service Provider, Issuers, and Cardholders

The processing of a credit card transaction typically involves the cardholder, a merchant, a merchant acquirer, the card issuer, and a card processing and service provider. FIG. 1 illustrates an exemplary relationship between a card processing and service provider 100, a number of issuers 102a, 102b . . . 102c, and a number of cardholders 120. The card processing and service provider 100 supports the issuers by authorizing and processing monetary transactions, as well as providing support for creating new accounts, modifying accounts, generating cardholder statements, applying payments to accounts, controlling communications to cardholders and building reward programs. An issuer, such as issuer 102b, is typically a bank or other financial institution that issues one or more credit card products. The issuer manages transaction processing at the account level. An issuer typically manages a number of accounts using a hierarchy, such as the Product/System, Principal, and Agent hierarchy shown in FIG. 1. The cardholders 120 are typically individuals holding a credit card or charge card, such as a VISA, MASTERCARD, or private label card. In addition to the elements shown in FIG. 1, additional elements (not shown) may also be included. For example, additional issuers, Products/Systems, Principals, and Agents may exist.

An issuer can issue different types and versions of credit card products. For example, issuer 102b could offer a VISA product and a MASTERCARD product. Each product could be offered in standard, gold and platinum versions. The Product/System blocks shown in FIG. 1 correspond to different products. If issuer 102b issues a VISA product and a MASTERCARD product, then Product/System 104a could correspond to the VISA product and Product/System 104b could correspond to the MASTERCARD product. An issuer typically uses either a BIN (bank identification number) or an IIN (issuer identification number) to identify its different credit card products.

Issuers typically use additional levels of reporting structures below the Product/System level to manage large portfolios. FIG. 1 illustrates that below the Product/System level is the Principal level and below the Principal level is the Agent level. The divisions between the Principal level and the Agent level are typically defined by the issuer. Some issuers use the Principal level and the Agent level to make geographical divisions. For example, Principal block 106a could correspond to a geographic region, such as the southeast, and Agent block 110a could correspond to a state within that region. The cardholders 120 are located below the Agent level. As shown in FIG. 1, a number of cardholders can be associated with a single Agent. FIG. 1 illustrates an example of the hierarchical relationships that exist between an issuer and a cardholder. As will be apparent to those skilled in the art, alternative hierarchies are also possible.

An individual can hold a number of different cards corresponding to a number of different accounts. Although the same cardholder is associated with each of the accounts, each account is processed independently by the issuer. If several cardholders are in the same family, then each cardholder may hold several cards. In the case of a family, the cardholders may be related and the payments may be made from family funds, but each account is still processed independently. For example, Table 1 illustrates the credit cards held by a typical family.

TABLE 1

| Cardholder | STANDARD VISA | STANDARD MC | GOLD MC | PRIVATE LABEL |
|---|---|---|---|---|
| MOTHER | Account 1 | | Account 2 | |
| FATHER | | | Account 3 | Account 4 |
| SON | Account 5 | | | |
| DAUGHTER | | Account 6 | | Account 7 |
| GRAND-FATHER | | Account 8 | | |

Each of the accounts shown in Table 1 is an independent account from the issuer's perspective. The standard MASTERCARD account associated with the daughter (Account 6) is independent of the standard MASTERCARD account associated with the grandfather (Account 8) and the gold MASTERCARD account associated with the mother (Account 2) is independent of the gold MASTERCARD account associated with the father (Account 3). The processing options used by the issuer to process the accounts shown in Table 1 can differ by product.

Figure 2:
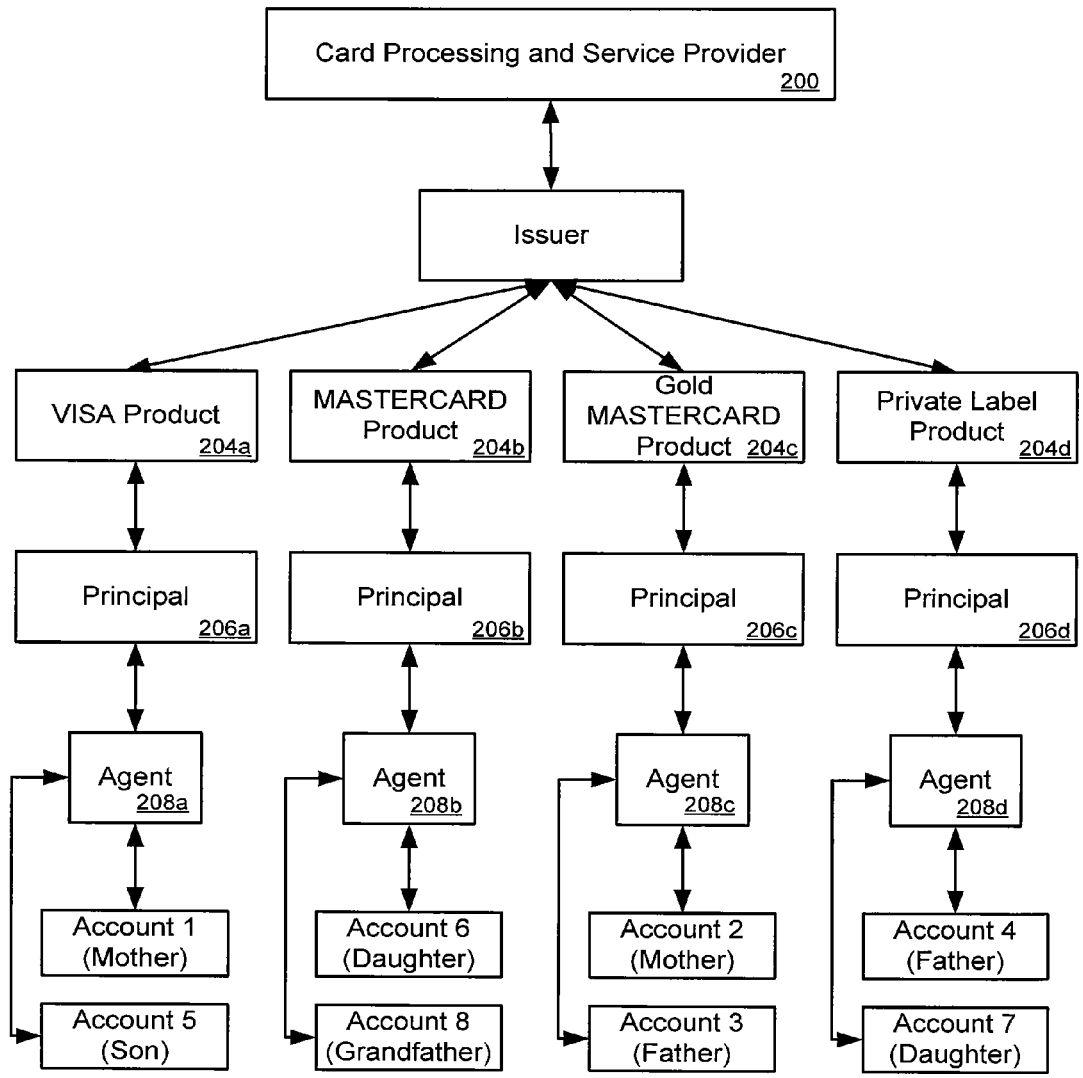
FIG. 2 is a block diagram illustrating an exemplary relationship between a card processing and service provider, an issuer and the cardholders within a group in accordance with an embodiment of the present invention.

The relationships between the different accounts shown in Table 1, the issuer, and the card processing and service provider are illustrated by FIG. 2. The card processing and service provider 200 supports the issuer 202. The issuer 202 issues a variety of credit card products, including a standard VISA product 204a, a standard MASTERCARD product 204b, a gold MASTERCARD product 204c, and a private label product 204d. Account 1 and Account 5 are shown under the standard VISA product 204a, Account 6 and Account 8 are shown under the standard MASTERCARD product 204b, Account 2 and Account 3 are shown under the gold MASTERCARD product 204c, and Account 4 and Account 7 are shown under the private label product 204d.

Groups and Group Relationships

In accordance with an embodiment of the present invention, the accounts shown in Table 1 and FIG. 2 can be linked together to create a group. A group can include a number of accounts that correspond to a single issuer. By linking accounts into a group, group processing can be performed on the accounts that are members of the group while maintaining independent processing of each of the accounts. Each group has a primary owner. Generally the primary owner corresponds to a cardholder for a key account. For example, the standard VISA account held by the mother could be designated as the key account for the group shown in Table 1 and FIG. 2. The remaining accounts in the group are referred to as dependent accounts. The relationship between a dependent account and the group is independent of the relationship between the remaining dependent accounts and the group. Typically, the issuer defines the possible relationships between a dependent account and the group.

FIG. 2 shows one possible organization for a group. Other organizations are also possible. As shown in FIG. 2, the accounts in a group can be associated with different products. There are no restrictions on the placement of the accounts in a group at the Product/System, Principal or Agent levels. The accounts in a group can be split between different Products/Systems, Principals and Agents. The key account and a dependent account can be associated with the same Agent. Multiple dependent accounts can also be associated with the same Agent. The accounts associated with an Agent are not required to be in the same group (or any group at all).

Figure 3:
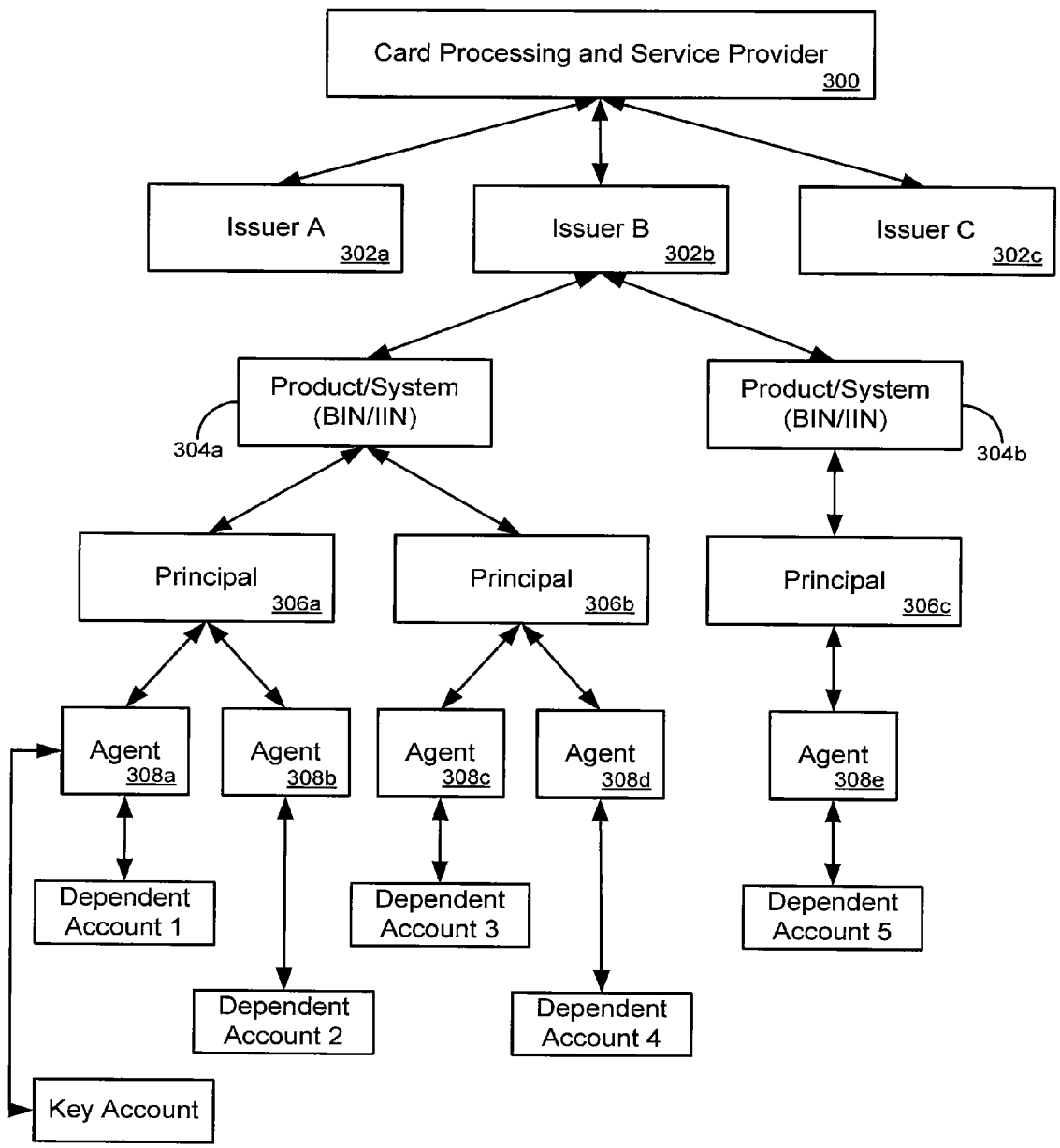
FIG. 3 is a block diagram illustrating the relationship between a card processing and service provider, issuers and the cardholders within a group in accordance with an embodiment of the present invention.

FIG. 3 shows an exemplary group where the key account and Dependent Account 1 are associated with the same Agent 308a. Dependent Account 2 is associated with a different Agent 308b, but is the same type of product 304a as the key account and Dependent Account 1. Dependent Account 3 is associated with a different Principal 306b than the key account, Dependent Account 1, and Dependent Account 2, but is the same type of product 304a. Dependent Account 4 is associated with a different Agent 308d than Dependent Account 3, but is associated with the same Principal 306b. Dependent Account 5 is a different product 304b than any of the other accounts in the group. Although FIG. 3 only shows a single group, additional groups or individual accounts can exist under the issuer 302b. Furthermore, additional groups can exist under the other issuers 302a, 302c.

Figure 4A:
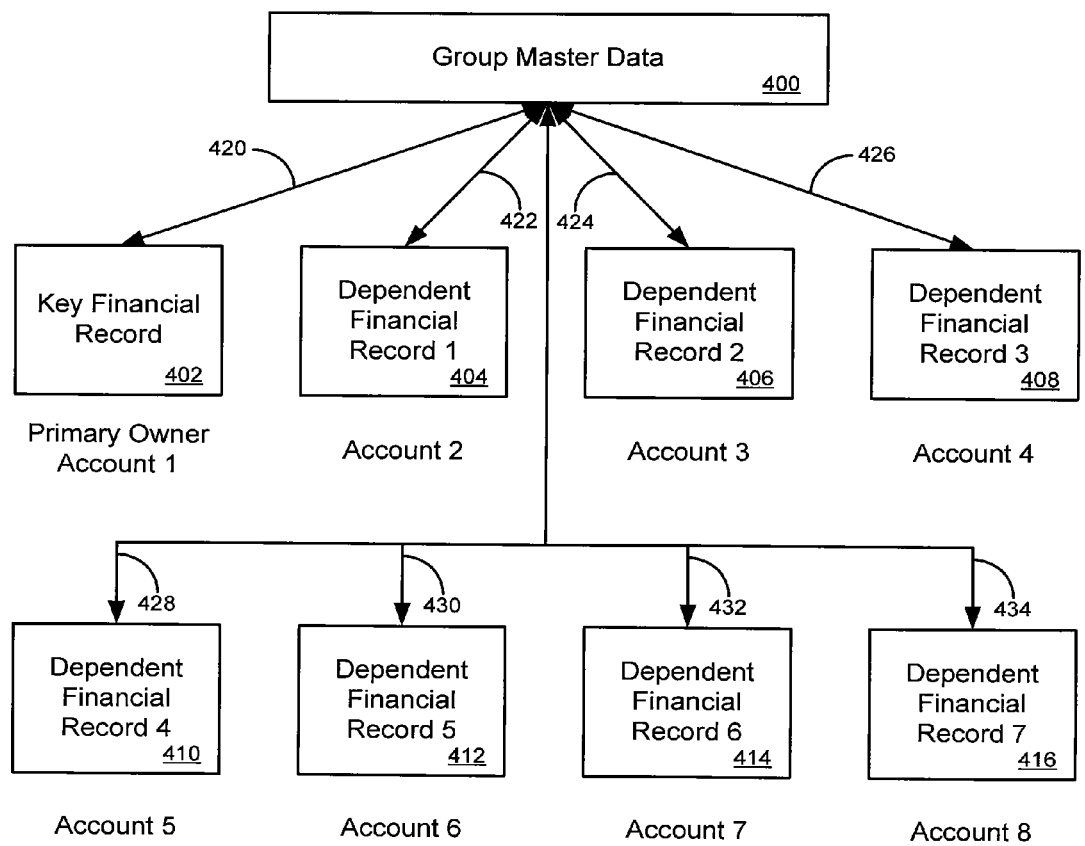
FIG. 4A is a block diagram illustrating the files included in the group master data in accordance with an embodiment of the present invention.

Linking the accounts into a group is accomplished by linking a financial record that corresponds to each account to group master data for the group. FIG. 4A illustrates the linking of the accounts shown in Table 1 into a group. The Group Master Data 400 includes information about the group, including group control settings, group aggregate data, and a group identifier. The Group Master Data 400 is discussed in more detail below in connection with FIG. 4B. The Key Financial Record 402 corresponds to the key or primary owner. The Key Financial Record 402 can also correspond to a key account held by the primary owner. In this example, the Key Financial Record 402 corresponds to the standard VISA account held by the mother. The relationship 420 between the Key Financial Record 402 and the Group Master Data 400 is a predefined relationship. Typically, the relationship is defined in part by the card processing and service provider and in part by the issuer.

In addition to the Key Financial Record, the group also includes Dependent Financial Records 404, 406, 408, 410, 412, 414, and 416 that correspond to the dependent accounts. Typically, a dependent account is associated with each dependent financial record. For example, Account 2 is associated with Dependent Financial Record 1 404. Each account is also associated with one or more cardholders, e.g. the mother is the cardholder associated with Account 2.

The dependent accounts in the group can cross product lines. In this example, Account 2 and Account 3 are MASTERCARD products, Account 4 and Account 7 are private label products, Account 5 is a VISA product, and Account 6 and Account 8 are MASTERCARD products. The relationship 422 between Dependent Financial Record 1 404 and the Group Master Data 400 is independent of the relationship between the remaining Dependent Financial Records and the Group Master Data.

The dependent accounts can also have different types of ownership. For example, the primary owner and a dependent cardholder can be jointly responsible for a dependent account, the primary owner can be responsible for a dependent account where a dependent cardholder is an authorized user, or a dependent cardholder can be solely responsible for a dependent account. In addition, a dependent cardholder can be jointly liable with the primary owner for the group liability. If a dependent cardholder is jointly liable with the primary owner for the group, then the dependent account is a jointly liable dependent account.

Group Master Data

Figure 4B:
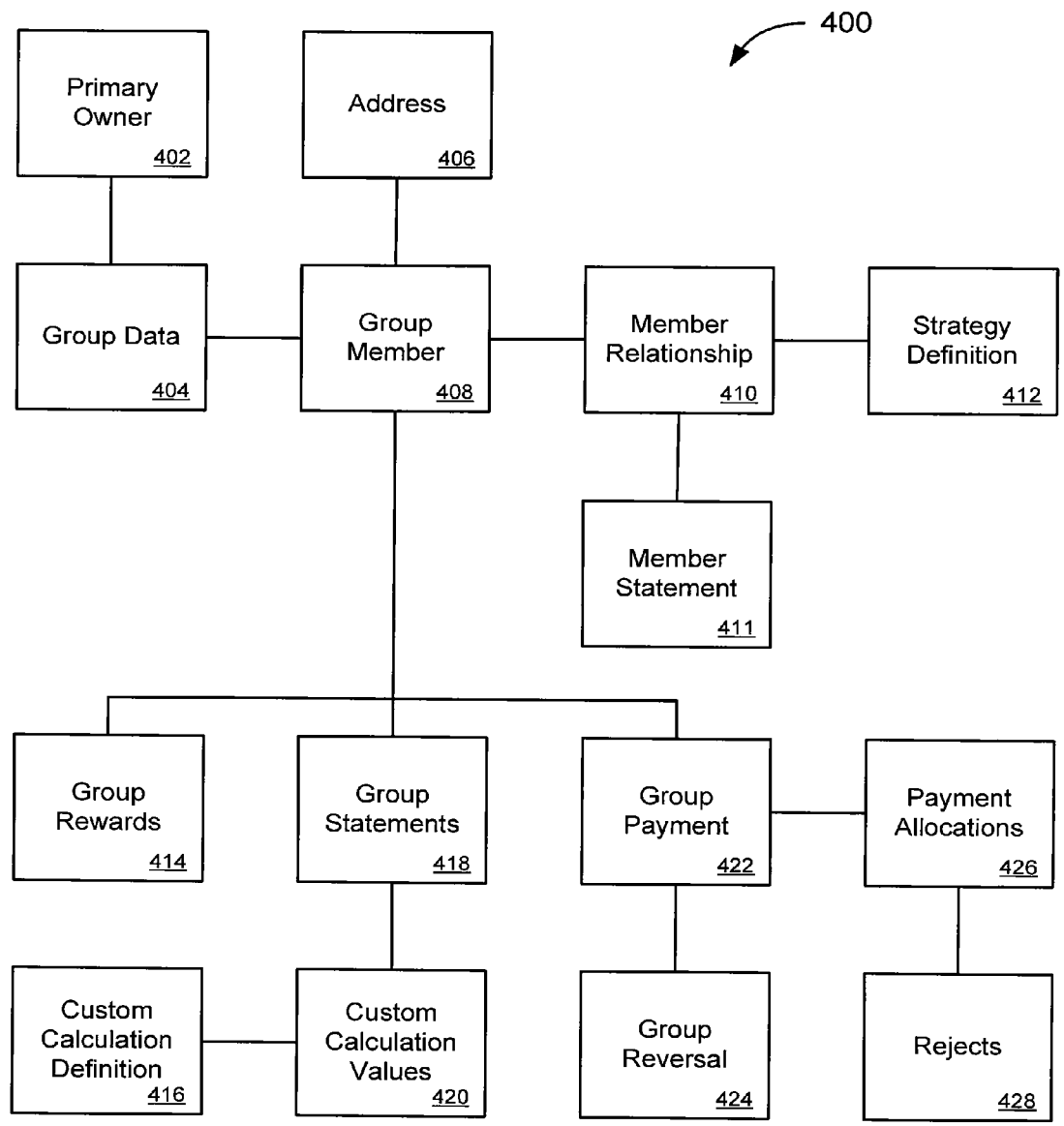
FIG. 4B is a block diagram illustrating group master data in accordance with an embodiment of the present invention.

The Group Master Data 400 is further illustrated in FIG. 4B. FIG. 4B illustrates a number of files 402-428. Each of the files includes records that contain information about the group and the accounts that are members of the group. The Group Data file 404 includes information about the group, such as a group identifier, a group cycle code, a group credit line, group available credit, and a group collector code. The group identifier identifies the group. Each of the records associated with the group includes the group identifier.

A group cycle code indicates the cycle code for the group. If the group includes a key account, then the cycle code for the key account typically is used as the group cycle code. If the group does not include a key account, then the group cycle code can be a default cycle code or can be based upon the cycle code of one of the dependent accounts in the group. The group credit line specifies the credit available for the accounts in the group that authorize against the group credit line. The group available credit specifies the current credit available for the accounts in the group that authorize against the group credit line. The group collector code may be set once a collector is assigned to one of the accounts in the group. A collector may be assigned because the account is delinquent. If another account in the group becomes delinquent, then the group collector code is checked and the same collector is assigned to that account if a group collection option is used.

The Primary Owner file 402 includes information about the primary owner of the group. The primary owner is the individual that is liable for the group. If more than one individual is liable for the group, then those individuals are jointly liable for the group and information about the individuals in stored in the Primary Owner file 402. For example, a primary owner and a dependent cardholder could be jointly liable for the group. For simplicity, the term "primary owner" is used herein to include a single primary owner or joint primary owners. Every group has a primary owner. If the group includes a key account, then the key cardholder is the primary owner.

The Group Member file 408 includes a record for each of the accounts that is (or was) a member of the group. Each record includes an account number, an indication as to whether the account is a key account or a dependent account, and group membership information. A record is maintained for an account in the Group Member file 408 even if the account is delinked from the group. Each record includes group membership information which indicates when the account was linked to the group and if the account is no longer a member of the group, when the account was delinked from the group. The Address file 406 includes a record for each of the accounts that is (or was) a member of the group. Each record includes the mailing address of the cardholder associated with the account.

The Member Relationship file 410 includes a record for each of the accounts that is (or was) a member of the group. A member relationship record contains information about the strategy associated with an account. If the strategy associated with the account has changed, then the member relationship record contains information about the previous strategy or strategies, as well as the current strategy. The member relationship record also contains information about the effective dates of each strategy.

The Strategy Definition file 412 includes a record for each of the defined strategies. The strategy definition records include the parameters and the parameter values that define the strategies referred to in the member relationship records. If the definition of a strategy has changed, then the strategy definition record for that strategy also includes the parameter and the parameter values that defined the previous version or versions of the strategy, as well as the effective dates of each strategy definition.

The Member Statement file 411 includes records for each account that is (or was) a member of the group. Each record includes a number of fields that store statement data (monetary information) for the associated account. In addition, each record includes a flag that indicates whether the associated account cycles with the group (i.e. has the same cycle code as the group) or cycles independently. The information stored in the Member Statement file 411 is used to generate the group statement, dependent cardholder statement, and/or a courtesy statement.

The Group Statement file 418 includes records that contain group monetary and group non-monetary information. The group monetary information includes the group balances, as well as the group credit line and group available credit for a particular statement. The group non-monetary information includes the group payment due date. Typically, the group payment due date is the earliest due date of all the accounts of the group that are paid by the primary owner. The information stored in the Group Statement file 418 is used to generate the group statement.

The information in the Member Statement file 411 and the Group Statement file 418 is used to determine the initial break up of a group payment. The information is also used to support the on-line display of statement information to an operator.

The Group Rewards file 414 includes a record for each of the reward programs for the group. Each record includes information about the reward program, such as a reward program identifier and the amount of group points accumulated in that reward program.

The Custom Calculation Definition file 416 and the Custom Calculation Values file 420 support customized group calculations that appear in a field on the group statement. Each custom calculation definition record includes a formula for a customized group calculation. Typically, a formula specifies that a customized group calculation is calculated using monetary elements from the accounts in the group. The value that is calculated using the formula is stored in a custom calculation values record.

The Group Payment file 422 includes a record for each group payment received. Each record includes the amount of the group payment and the date the group payment was received. The Payment Allocations file 426 includes a record for each group payment received. Each record indicates how the group payment was allocated among the accounts in the group. The Group Reversal file 424 includes a record for each group payment that has been reversed. If a group payment is reversed, then the reversal is made by referencing the Payment Allocation file 426 to determine how the payment was originally allocated.

The Rejects file 428 includes records of rejections detected during processing other than group processing. A record in the Rejects file 428 includes a rejection report that provides details of the rejection.

As will be apparent to those skilled in the art, the files shown in FIG. 4B are exemplary group master data files. The group master data could be stored using alternative types of files and records.

Dependent Strategies

Typically, the relationship shown in FIG. 4A between the Dependent Financial Records 422, 424, 426, 428, 430, 432, 434 and the Group Master Data 400 is defined by a set of parameters. The parameters are typically provided by the card processing and service provider. A set of parameters and parameter values can be selected to create a customized dependent strategy. Either the card processing and service provider or the issuer can select the parameters and the parameter values to create a dependent strategy. Preferably, the card processing and service provider provides parameters and the issuer selects a set of parameter values that is suitable for a particular situation. Alternatively, the card processing and service provider could provide strategies rather than parameters to define the strategies. If the card processing and service provider provides strategies, then each of the issuers supported by the card processing and service provider chooses among the same group of strategies. However, if the card processing and service provider provides parameters, then each issuer can customize the strategies offered to its customers. In some embodiments the dependent strategies are labeled. For example, a dependent strategy for a college-age child residing at school may have one label, whereas a dependent strategy for a second account for the primary owner may have another label.

A dependent strategy specifies the relationship between a dependent account and the group by specifying group processing options for the account. The group processing options provide flexibility in the relationships between the dependent accounts and the group and provide for automatic processing at the group level. Typically, the dependent strategy includes parameters that define how transactions are authorized for the dependent account, as well as whether payment for the account is due from the primary owner or from the dependent account cardholder. In addition the dependent strategy includes options for payment application, statement generation, cardholder communications, and reward pooling.

The parameter values could be selected to create a dependent strategy appropriate for a dependent, college-age child that resides at school. The parameter values could be selected so that the child is liable for the account and the parent receives information about the activity of the account. Alternatively, the parameter values could be selected so that the parent and the child are jointly liable for the account and that both the parent and the child receive information about the activity of the account at their respective residences. Another strategy could be created for a high school-age child living at home. The parameter values could be selected so that the primary owner, typically the parent, is financially liable for the account and the account has a predetermined limit. The primary owner could set the limit on the account.

The parameter values could also be selected to create a strategy for a dependent account held by the primary owner. The primary owner could use the key account and the dependent account to segregate expenses. The parameter values could be selected so that the primary owner is liable for the account and detailed information about the account is included on the group statement. As will be apparent to those skilled in the art, additional strategies can also be created to address the needs of other situations.

Creating a Group

There are a number of ways that a group can be created. One way to create a group is to create a group using new accounts. Another way to create a group is to link a number of existing accounts together. Typically, a group is created by an issuer. The group can be created using either on-line or batch processing. Once the first account is identified as being a member of the group, the group master data is automatically generated. Once a group is created, additional accounts can be added to the group or existing accounts can be removed from the group.

Business rules are used to insure that the relationships between the accounts in the group are valid. The business rules define the types of accounts that can be linked together in a group. Typically, the business rules are promulgated by the card processing and service provider. The business rules are checked whenever group relationships are impacted. For example, the business rules are checked when a group is created or an account is added to or removed from a group. Shown below is a list of typical business rules. As will be apparent to those skilled in the art, the number and types of business rules may vary from that shown below.

(1) A group must have one and only one primary owner.
(2) A group will not exist without at least one account linked to it or a historical relationship to an account.
(3) Dependent accounts must have dependent strategies.
(4) All accounts that statement together must have the same cycle code and method.
(5) All accounts in the group must have the same issuer number.
(6) Accounts within a group cannot be dual. A dual account is an account that corresponds to two different credit card products. For example, a dual account could correspond to a VISA product and a MASTERCARD product.
(7) Accounts within a group cannot be included in a Combine Account Transfer. A Combine Account Transfer is a process that merges two accounts into a single joint account.
(8) Accounts in the group cannot have a commercial card relationship.
(9) The key account cannot have a status of bankrupt, closed or charge-off without impacting the dependent accounts.

Creating a Group Using New Accounts

Figure 5:
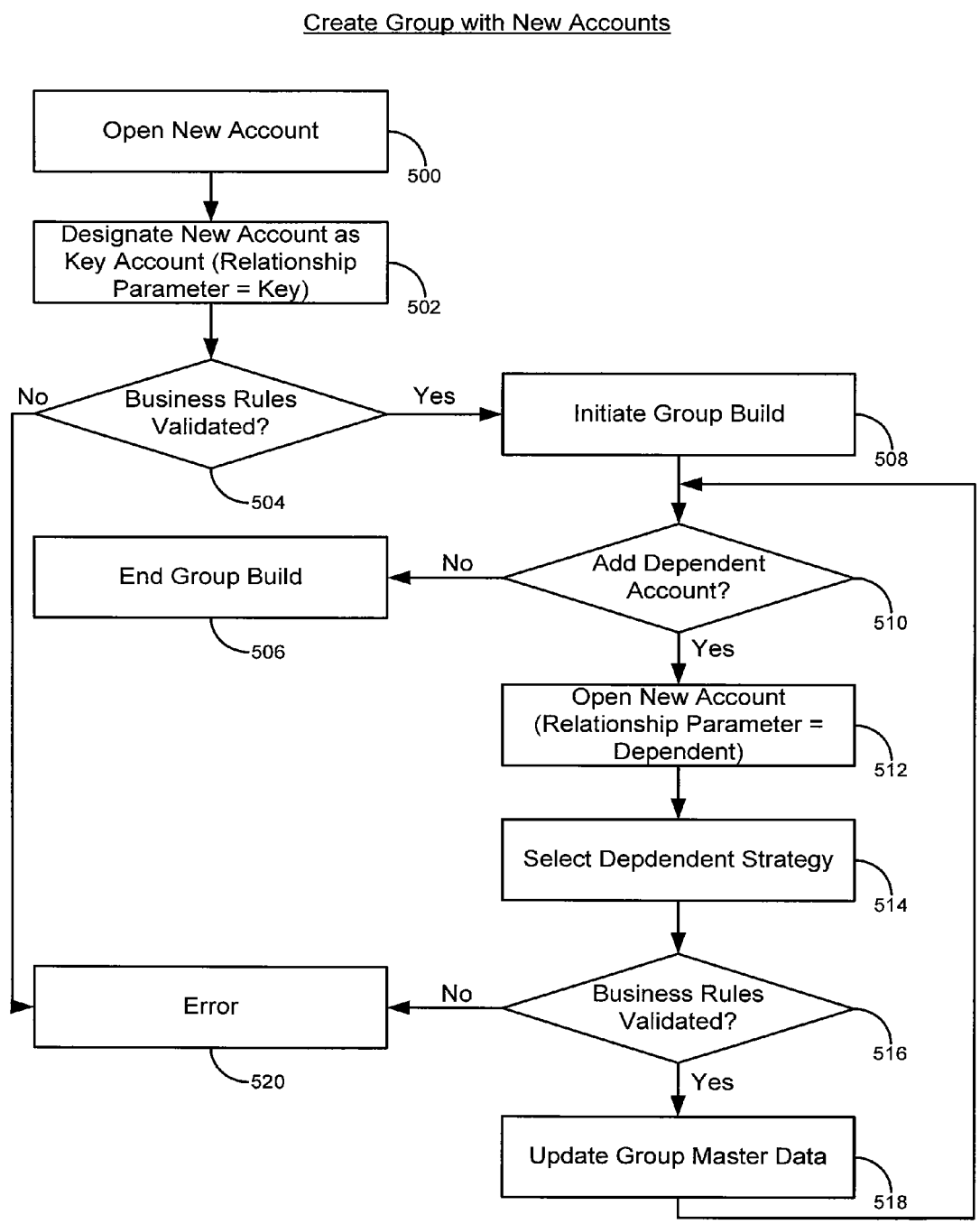
FIG. 5 is a flow diagram illustrating the steps for creating a group using new accounts in accordance with an embodiment of the present invention.

An exemplary method for creating a group using new accounts is shown in FIG. 5. In step 500, a new account is opened. The new account is designated as the key account in step 502 by setting a relationship parameter for the account to "key." The relationship parameter defines the relationship between the account and the group. When the key account is opened, a number of account parameters and group parameters are automatically set. For example, parameters defining the cycle code and method and the currency code are typically defined at the time the account is opened. In step 504, the parameters set in step 500 are compared to the set of business rules. If the parameters set in step 500 satisfy the business rules, then the business rules are validated.

If the determination in step 504 is that the business rules are validated, then the "Yes" branch is followed to step 508.

In step 508, the group build is initiated and the key financial record and the group master data are created. Typically, the key financial record includes the account parameters for the key account plus the relationship parameter and a group identifier. The group master data includes a group identifier and certain group parameters. If the determination in step 504 is that the business rules are not validated, then the "No" branch is followed to step 520 and an error occurs.

Although FIG. 5 illustrates that a key account is created in steps 500 and 502, a group can be created without a key account. If a key account is created, then the key account cardholder is the primary owner. However, if a group is created without a key account, a primary owner is required. A key financial record is created regardless of whether the group includes a key account.

The remaining steps in FIG. 5 illustrate adding dependent accounts to the group. In step 510, a determination is made as to whether a dependent account is to be added to the group. If a dependent account is to be added to the group, then the "Yes" branch is followed to step 512 and a new account is opened. The new account is designated as a dependent account by setting the relationship parameter for the account to dependent. From step 512, the method proceeds to step 514 where a dependent strategy is selected. Typically, an issuer provides a number of dependent strategies that can be used for dependent accounts within a group. Once a dependent strategy is selected, then a determination is made in step 516 as to whether the parameters selected in opening the dependent account and the dependent strategy satisfy the business rules. If the business rules are satisfied, then the business rules are validated in step 516 and the method proceeds to step 518. In step 518, the dependent financial record is created and the group master data is updated. Typically, the dependent financial record includes account parameters for the dependent account, as well as the relationship parameter, a group identifier, and a dependent strategy identifier. Updating the group master data includes creating the link between the dependent financial record for the dependent account and the group master data.

From step 518 the method returns to step 510 and a determination is made as to whether another dependent account is to be added. If another dependent account is to be added, then steps 512, 514, 516, and 518 are repeated. Once all the dependent accounts have been added, then the method proceeds from step 510 via the "No" branch to step 506 and the method ends.

FIG. 5 illustrates that business rules are validated after the key account or a dependent account is opened. Alternatively, if the accounts are opened in an on-line environment, then the business rules can be validated as the accounts are opened. For example, an operator can be prevented from creating an invalid relationship, such as creating two key accounts. FIG. 5 also illustrates that the group master data is updated after the addition of each dependent account. However, the group master data can be updated at other times. For example, information for opening a key account and dependent accounts may be collected by the issuer and then submitted by the issuer to the card processing and service provider in batch. If the information is submitted in batch, then the group master data may be updated once with information for all of the accounts in the group.

Creating a Group Using Existing Accounts

Figure 6:
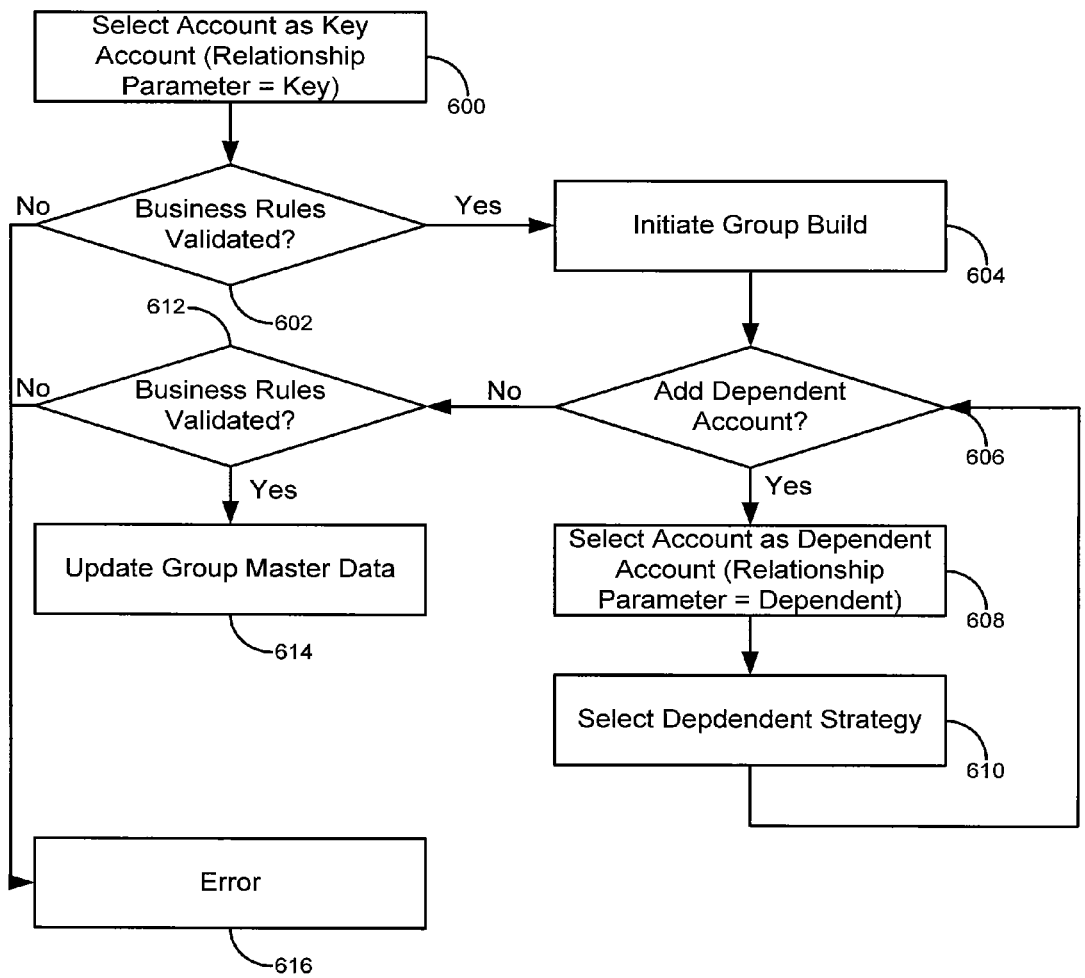
FIG. 6 is a flow diagram illustrating the steps for creating a group using existing accounts in accordance with an embodiment of the present invention.

FIG. 6 illustrates the steps for creating a group using existing accounts. In step 600, an existing account is selected as the key account by setting the relationship parameter for the account to key. If the account was not previously a member of a group, then the relationship parameter was blank. Once an existing account is selected as the key account, then in step 602 a determination is made as to whether the business rules are validated. The business rules are validated if the parameters for the key account satisfy the business rules.

If the business rules are validated, then the method follows the "Yes" branch to step 604. In step 604, the group build is initiated. Initiating the group build includes creating the group master data, and linking the key account to the group by linking the key financial record to the group master data.

Once the initial group build is complete, then a determination is made in step 606 as to whether a dependent account is to be added to the group. If a dependent account is to be added to the group, then the "Yes" branch is followed to step 608. In step 608, an account is selected as a dependent account. Once an account is selected as a dependent account, the relationship parameter for the selected account is set to dependent. In step 610, a dependent strategy is selected for the dependent account. From step 610 the method returns to step 606 and a determination is made as to whether another dependent account is to be added to the group.

Once all the dependent accounts have been added to the group, then the "No" branch is followed from step 606 to step 612. In step 612, a determination is made as to whether the business rules are validated. The business rules are validated in step 612, if the dependent accounts satisfy the business rules. If the business rules are validated in step 612, then the "Yes" branch is followed to step 614. In step 614, the group master data is updated with information for the dependent accounts. In addition, the dependent financial records for the dependent accounts are linked to the group master data. However, if the business rules are not validated in step 612, then the "No" branch is followed to step 616 and an error occurs.

Although FIG. 6 illustrates that the group master data is updated after all the dependent accounts have been selected, those skilled in the art will appreciate that the group master data could be updated at other points in the process. For example, if the group is being created using on-line processing, then validating the business rules and updating the group master data could occur after step 610 for each dependent account added.

Changing Group Relationships

The relationships between the accounts of the group are flexible and can be modified. The relationship between a dependent account and the group can be changed by selecting a new dependent strategy. The ability to modify the dependent strategy allows the account to change as the cardholder's situation changes. For example, if the initial dependent strategy was a strategy suitable for a high school age child living at home, then the dependent strategy could be modified to a strategy suitable for a college age child living at school once the child enters college and moves away from home. Changing the dependent strategy of one of the dependent accounts does not impact the dependent strategies of the other dependent accounts.

In addition, a dependent account can be added to the group or deleted from the group without affecting the remaining accounts in the group. The ability to add dependent accounts and delete dependent accounts allows the group to change to accommodate changes in the relationships between the primary owner and the dependent cardholders. To add a dependent account to a group, the dependent financial record for the dependent account is linked to the group master data. Adding a dependent account to a group may correspond to the primary owner or a dependent cardholder obtaining another card or may correspond to adding another dependent cardholder to the group. For example, a group could be established for a family that includes a mother, father and daughter. When the group is created, the group could include financial records corresponding to accounts held by the mother and father. Subsequently, a dependent financial record could be added for an account for the daughter.

To remove a dependent account from a group, the dependent financial record for the dependent account is delinked from the group master data. Removing a dependent account from a group may correspond to a change in family status. For example, a group could be established for a married couple with the husband as the primary owner and the wife as a dependent cardholder. If the couple divorces, then the group could be modified to delete the dependent financial records that correspond to accounts held by the wife. As will be apparent to those skilled in the art, a dependent account can also be removed from a group for reasons other than a change in family status.

A single account can be removed from a group or a number of accounts can be removed from a group. If an account is removed from a group, it can be moved to an existing group, used to create a new group, or can be designated as an independent account that is not a member of any group. If a dependent account is moved to an existing group, then the group identifier in the dependent financial record is changed to correspond to the group identifier for the existing group. If a dependent account is removed from one group and is used to create another group, then the dependent account can remain a dependent account or can be "matured" into a key account. To mature a dependent account into a key account, the relationship parameter for the dependent account is changed from dependent to key. If a dependent account is matured into a key account, the history for the dependent account that was accrued during the period that the dependent account was a member of the group follows the dependent account to the new group. If the dependent account is designated as an independent account, then the relationship parameter is set to blank.

If all the accounts in a group are removed from the group, then the group continues to exist for some pre-defined period of time even though the group does not have any members. The group continues to exist so that audit history for the group can be maintained for the pre-defined period of time.

The primary owner of the group can be changed. The primary owner can be changed to a cardholder that corresponds to one of the dependent accounts or to a new primary owner. To change the primary owner to a dependent cardholder, the relationship parameter for the dependent account is changed from dependent to key. The original key account can be converted to a dependent account by changing the relationship parameter from key to dependent. Alternatively, the original key account can be removed from the group and transferred to another group (as either a key or dependent account) or established as an individual account in a manner similar to that described in the preceding paragraph.

A group history is maintained in the group master data. For example, as discussed above in connection with FIG. 4B, information on all the accounts that are or ever were members of the group are stored in the Group Member file. The history of any changes in the dependent strategy for a dependent account are maintained in the Member Relationship file and the history of any changes in the definition of a strategy is maintained in the Strategy Definition file. In addition to group history, account history is also maintained with each account. The account history follows the account notwithstanding changes in the account's membership in a group. For example, payment history for a dependent account follows the dependent account even if the dependent account is delinked from the group and is established as an individual account.

Adding a Dependent Account to a Group

Figure 7A:
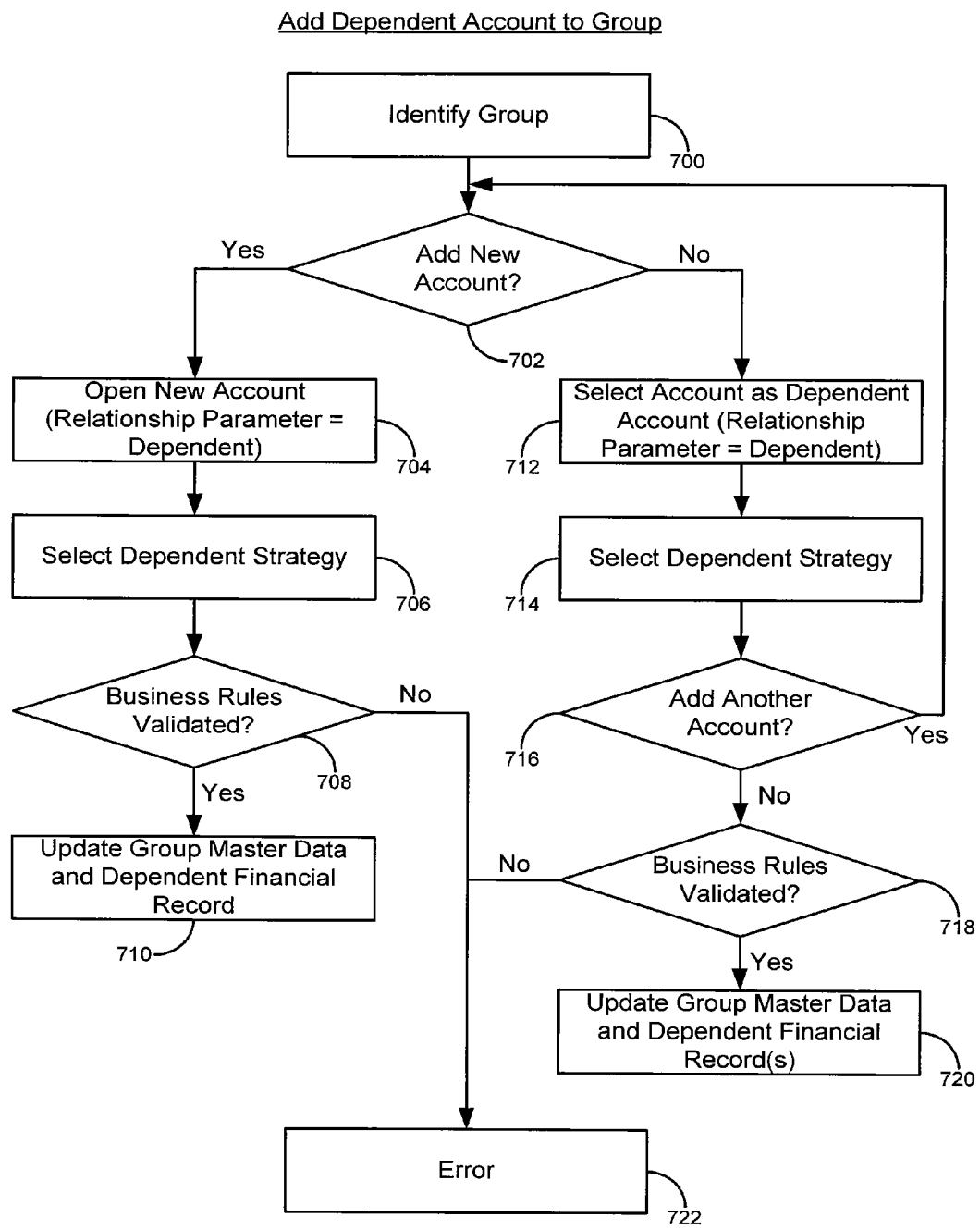
FIG. 7A is a flow diagram illustrating the steps for adding a dependent account to a group in accordance with an embodiment of the present invention.

Once a group is created, additional dependent accounts can be added to the group. The additional dependent accounts can be newly created accounts or can be existing accounts. FIG. 7A illustrates the steps for adding a dependent account to an existing group. In step 700, a group is identified. Typically a group is identified using the group identifier. In step 702, a determination is made as to whether an existing account is to be added or whether a new account is to be added. If a new account is to be added, then the "Yes" branch is followed to step 704. In step 704, a new account is opened and the relationship parameter for the account is set to dependent. A dependent strategy for the new account is selected in step 706. In step 708, a determination is made as to whether the dependent account opened in step 704 satisfies the business rules. If the dependent account satisfies the business rules, then the business rules are validated and the "Yes" branch is followed to step 710. In step 710, the group master data is updated. If the business rules are not validated in step 708, then the "No" branch is followed to step 722 and an error occurs.

If the determination in step 702 is that an existing account is to be added, then the "No" branch is followed to step 712. In step 712, an existing account is selected and the relationship parameter for the account is set to dependent. A dependent strategy for the account is selected in step 714. The parameters for the dependent account created in step 712 are compared to the business rules in step 718. If the parameters for the dependent account satisfy the business rules, then the business rules are validated and the "Yes" branch is followed to step 720. In step 720, the group master data is updated. However, if the business rules are not validated then the "No" branch is followed to step 722 and an error occurs.

Although FIG. 7A indicates that the group master data is updated after each dependent account is added to the group, the group master data can be updated at other points in the process. For example, if multiple accounts are to be added to an existing group, then the steps shown in FIG. 7A would be repeated for each account. Rather than updating the group master data after the addition of each dependent account, the group master data could be updated after the addition of all the dependent accounts. Updating the group master data after the addition of each account can be used to support on-line processing, whereas updating the group master data after the addition of a number of dependent accounts can be used to support batch processing.

Group Processing

Once a group is created it can be used to perform group processing. Group processing typically includes authorizing transactions, applying group payments, creating group statements, controlling cardholder communications, and administering reward programs for the accounts in the group. Information from both the key account and the dependent accounts are used for group processing. Each dependent account has an associated dependent strategy that specifies group processing options for the dependent account. Although the accounts of a group are subject to group processing for some functions, the accounts are treated as individual accounts for other functions.

Authorizing a Transaction

The dependent strategy for a dependent account specifies the authorization option for the dependent account. The authorization option specifies the information that is used to authorize a transaction. In one embodiment of the invention, three authorization options are available for a dependent account. One authorization option considers only the credit line and available credit of the group, a second option considers only the credit line and available credit of the dependent account, and a third option considers the credit line and the available credit of both the group and the dependent account.

Depending upon the authorization option selected, the authorization processing uses the group credit line and the group available credit and/or the dependent credit line and the dependent available credit. The group credit line is a group parameter that typically is set when the group is created. The dependent credit line is a dependent account parameter that is set when the dependent account is opened. The group credit line and the dependent credit line can be modified. The group available credit is calculated real time using activity from the key account (if any) and any dependent accounts that share the group credit line. A dependent account shares the group credit line if payment for the dependent account is due from the primary owner. Generally, the group available credit is calculated by subtracting the current balances and any outstanding authorizations of the key account and the dependent accounts that share the group credit line from the group credit line. Similarly, the dependent available credit is calculated by subtracting the current balance and any outstanding authorizations of the dependent account from the dependent credit line.

Figure 7B:
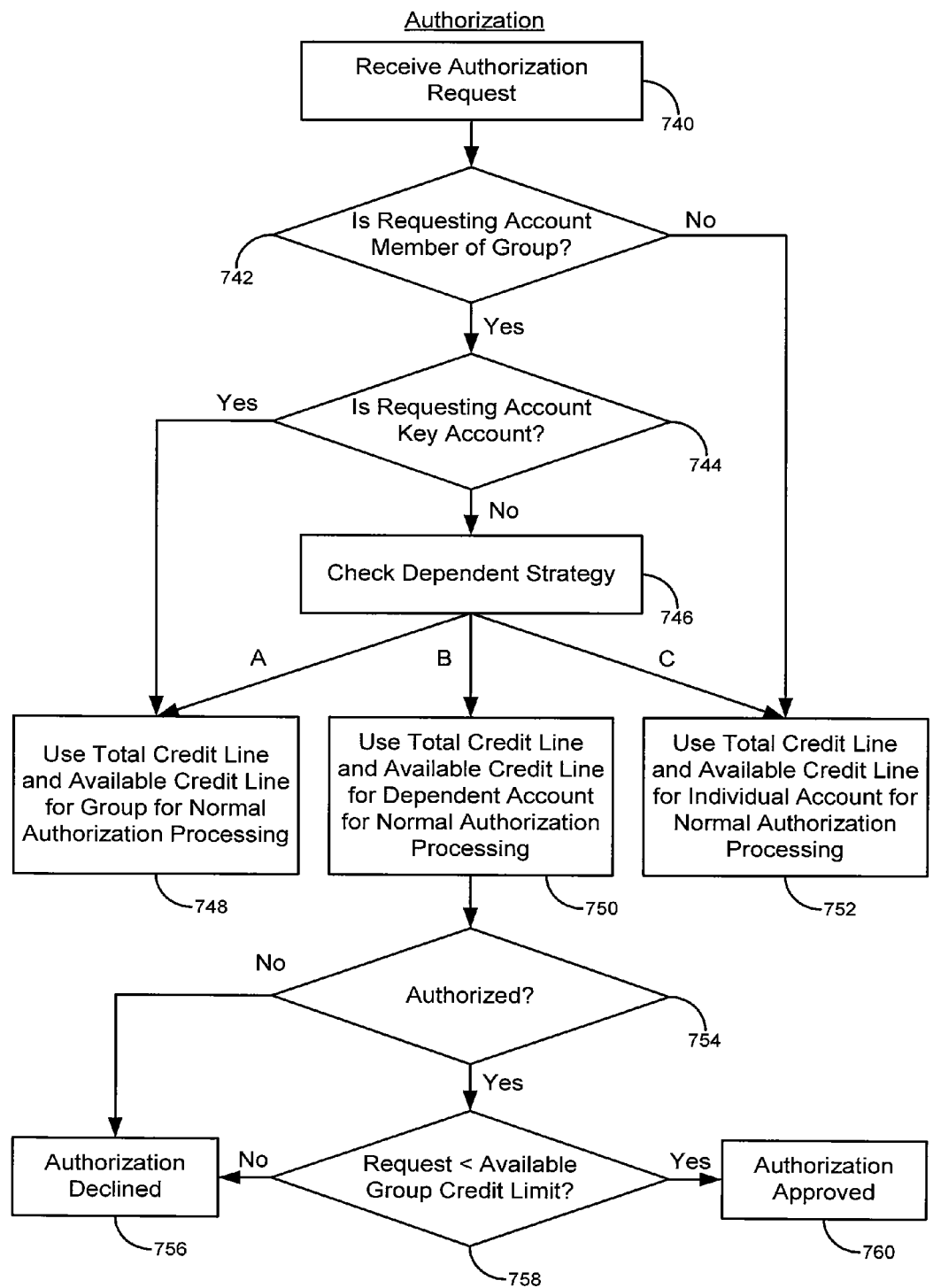
FIG. 7B is a flow diagram illustrating the steps for authorizing a transaction in accordance with an embodiment of the present invention.

FIG. 7B illustrates exemplary steps for authorizing a transaction. In step 740, an authorization request is received. The authorization request includes a transaction amount and an account identifier, such as an account number. In step 742, a determination is made as to whether the account identifier corresponds to an account that is a member of a group. If the requesting account is not a member of a group, then the "No" branch is followed to step 752. In step 752, normal authorization processing occurs using the credit line and the available credit for the account.

Normal authorization processing typically includes several calculations that use the credit line and the available credit. For example, authorization may include comparing the amount of the transaction to the available credit, comparing the amount of the transaction to a percentage expansion of the credit line, as well as comparing the transaction to past transactions for the account. Comparing the transaction to past transactions for the account may be used to detect possible fraudulent uses of a card and may result in the issuance of a referral code. As will be apparent to those skilled in the art, additional calculations can also be performed.

If the determination in step 742 is that the requesting account is a member of a group, then the "Yes" branch is followed to step 744. In step 744, a determination is made as to whether the requesting account is a key account or a dependent account. If the requesting account is a key account, then the "Yes" branch is followed to step 748. In step 748, normal authorization processing occurs using the group credit line and the group available credit.

If the determination in step 744 is that the requesting account is a dependent account, then the "No" branch is followed to step 746. In step 746, the dependent strategy is checked to determine the authorization option that corresponds to the dependent account. FIG. 7B illustrates three possible authorization options, A, B and C. Option A specifies that the credit line and the available credit for the group are used for authorization processing. Option B specifies that the credit line and the available credit for both the group and the dependent account are used for authorization processing. Option C specifies that the credit line and the available credit for the dependent account are used for authorization processing.

If the dependent strategy specifies option A, then the method proceeds from step 746 to step 748 and the credit line and the available credit for the group are used for normal authorization processing. If the dependent strategy specifies option C, then the method proceeds from step 746 to step 752 and the credit line and the available credit for the dependent account are used for normal authorization processing. The difference between the authorization processing performed in step 748 and the authorization processing performed in step 752 is that step 748 uses group information, whereas step 752 uses dependent account information.

If the dependent strategy specifies option B, then the method proceeds from step 746 to step 750 and the credit line and the available credit for both the group and the dependent account are used for authorization processing. In step 750, the credit line and the available credit for the dependent account are used in normal authorization processing. The authorization processing performed in step 750 is similar to that performed in step 752. However, additional processing is required for option B. In step 754, a determination is made as to whether the processing performed in step 750 indicates that the authorization request is authorized. If the processing performed using the dependent account information indicates that the request is authorized, then the "Yes" branch is followed to step 758. In step 758, a determination is made as to whether the transaction amount specified in the authorization request exceeds the group available credit. If the amount does not exceed the group available credit, then the "Yes" branch is followed to step 760 and the authorization request is approved. If the processing performed in step 754 indicates that the authorization request is denied or if the comparison performed in step 758 indicates that the amount of the request exceeds the group available credit, then the "No" branch is followed to step 756 and the authorization request is declined.

Applying a Payment

The dependent strategy for a dependent account specifies whether payment of the dependent account balance is due from the primary owner or is due from the dependent cardholder. If payment of the dependent account is due from the dependent cardholder, then the entire amount of a payment received from the dependent cardholder is credited to the dependent account. However, if the dependent account is paid by the primary owner, then the amount of the group payment that is credited to the dependent account depends upon the amount of the group payment, as well as the control settings for the group. Payment of the key account is due from the group payment.

The allocation of a group payment is partially determined by the amount of the payment and partially determined by the group payment options. The group payment options are typically set by the issuer. The group payment options could be part of the group control settings in the group master data. Alternatively, the group payment options could be stored in a separate file, such as a Product Control File, and associated with the group through the key account or through another means.

Only accounts included in the group balances during the processing of the last group statement are included in the automatic allocation of a group payment. The group balances for the last group statement can be determined from the Group Statement files in the group master data. The account balances for accounts in the group can be determined from the Member Statement files in the group master data.

Typically, the amount of the group payment is compared to one or more of the group balances. The group balances include the Last Statement Balance ("LSB") and the Minimum Payment Due ("MPD") for the group. The group balances may also include the group delinquency amount. The group LSB is determined by adding the LSB of the key account (if any) to the LSB of all dependent accounts in the group that are paid by the primary owner. If payment for a dependent account is due from the dependent cardholder, then the LSB of that dependent account is not included in the group LSB. The group MPD is calculated by adding the MPD for the key account (if any) to the MPD for each of the dependent accounts that are paid by the primary owner. The group delinquency amount is determined by adding the account delinquency of the key account (if any) to the account delinquency of the dependent accounts that are paid by the primary owner.

Figure 8A:
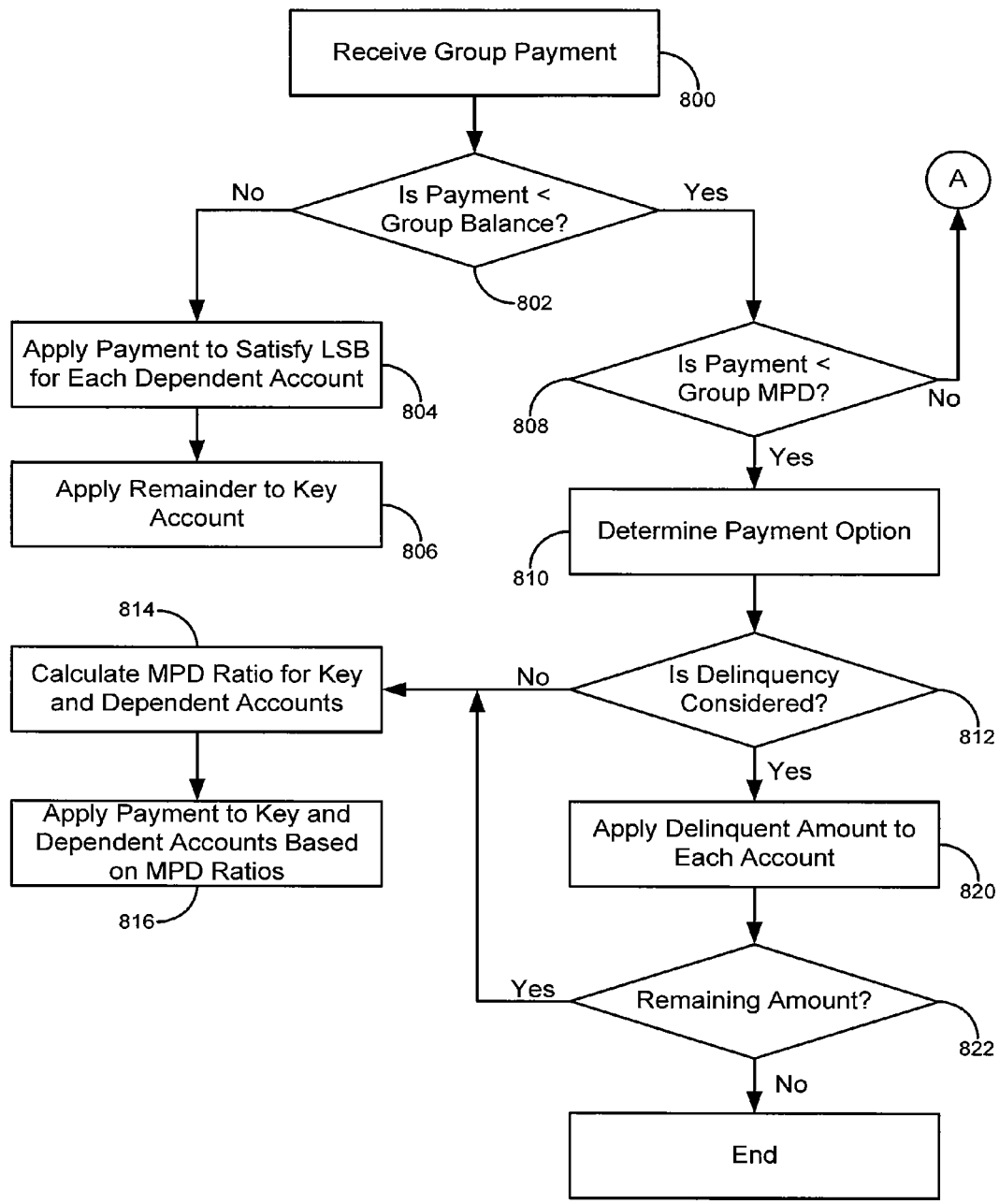
FIGS. 8A and 8B are flow diagrams illustrating the steps for applying a payment in accordance with an embodiment of the present invention.
Figure 8B:
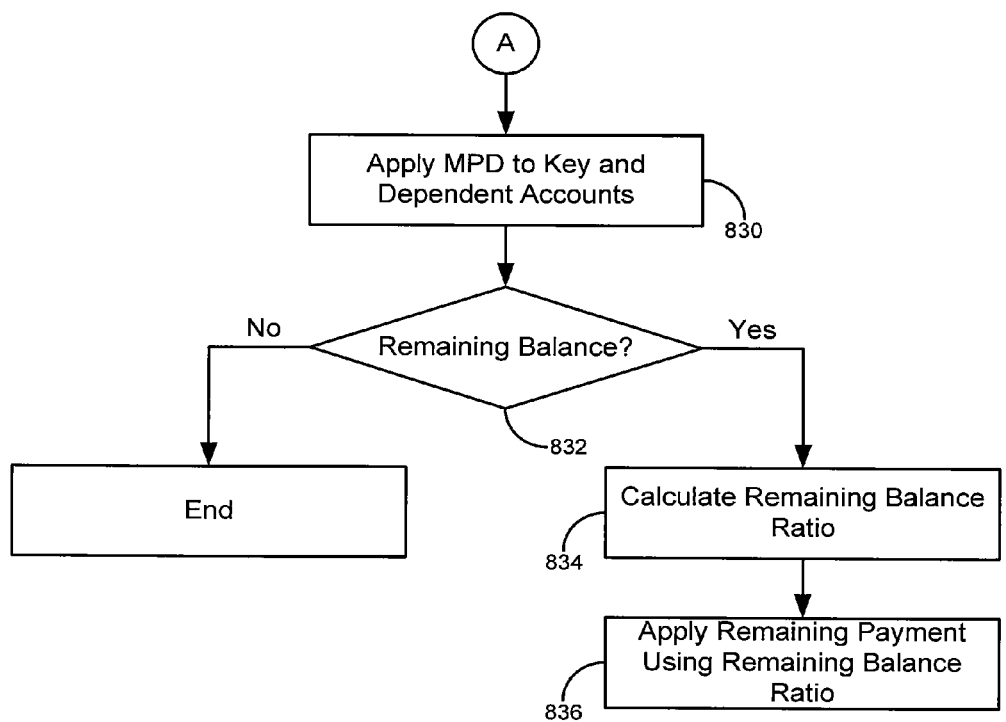

FIGS. 8A and 8B illustrate an exemplary method for applying a group payment. In step 800, the group payment is received. A determination is made in step 802 as to whether the payment is less than the group LSB. If the group payment is greater than or equal to the group LSB, then the "No" branch is followed to step 804. In step 804, the payment is applied to the dependent accounts in an amount equal to the LSB for each account. The remainder of the group payment is applied to the key account in step 806. If the payment is equal to the group LSB, then the amount applied to the key account is step 806 is equal to the LSB of the key account. However, if the group payment is greater than the group LSB, then the amount applied to the key account in step 806 is greater than the LSB of the key account. Although FIG. 8A illustrates that any overpayment is credited to the key account, an overpayment could be shared between the accounts of the group. Whether an overpayment is credited to the key account or shared between the accounts is typically determined by the group payment options.

If the determination in step 802 is that the group payment is less than the group LSB, then the "Yes" branch is followed to step 808. In step 808, a determination is made as to whether the group payment is less than the group MPD. If the group payment is less than the group MPD, then the "Yes" branch is followed to step 810. In step 810, the group payment options are determined. In step 812, a determination is made as to whether the group payment options indicate that account delinquency is considered in applying a group payment. If account delinquency is not considered, then the "No" branch is followed to step 814. In step 814, MPD ratios are calculated for the key account and the dependent accounts that are paid by the primary owner. An MPD ratio is calculated for an account by comparing the MPD for the account with the group MPD. Once the MPD ratios for the key account and the dependent accounts that are paid by the primary owner are calculated in step 814, then in step 816 the payment is applied to the key account and the dependent accounts in the group in accordance with the MPD ratios calculated in step 814.

If the determination in step 812 is that account delinquency is considered in applying the group payment, then the "Yes" branch is followed to step 820. In step 820, the group payment is applied to the key account and the dependent accounts paid by the primary owner to satisfy the delinquent amount for each account. In step 822, a determination is made as to whether there is any amount of the payment remaining. If there is an amount of the payment remaining, then the "Yes" branch is followed to step 814 and the remaining payment is allocated based upon the MPD ratios for the key account and the dependent accounts paid by the primary owner. If the determination in step 822 is that there is no remaining balance, then the method ends.

If the determination in step 808 is that the group payment is greater than or equal to the group MPD, then the "No" branch is followed to step 830 of FIG. 8B. In step 830, the group payment is allocated between the key account and the dependent accounts that are paid by the primary owner to satisfy the MPD for each account. A determination is made as to whether there is any amount of the group payment remaining in step 832. If there is an amount of the group payment remaining, then the method proceeds to step 834. In step 834, a remaining balance ratio is calculated for each of the accounts. A remaining balance ratio is calculated by comparing the remaining balance for an account to the remaining balance for the group. The remaining balance for an account is calculated by subtracting the MPD from the LSB for the account. The remaining balance for the group is calculated by subtracting the group MPD from the group balance. Once the remaining balance ratios are calculated in step 834, then the remainder of the payment is applied in accordance with the remaining balance ratios in step 836. If the determination in step 832 is that there is no remaining balance, then the method ends.

As will be apparent to those skilled in the art, other payment ratios could be considered when allocating a group payment among the accounts in the group other than those shown in FIGS. 8A and 8B. For example, as an alternative to steps 814 and 816, the group payment could be allocated based upon a LSB ratio rather than an MPD ratio or based upon an account hierarchy. An LSB ratio for an account can be calculated by comparing the LSB for the account to the LSB for the group. An account hierarchy specifies the order in which the accounts of a group are to be paid. Similarly, MPD ratios could be used as an alternative to the remaining balance ratios illustrated in FIG. 8B. Moreover, other account conditions could be considered in allocating a group payment. For example, in addition to or as an alternative to considering delinquent amounts, disputed amounts could be considered.

The exemplary method for payment application illustrated by FIGS. 8A and 8B is based upon the amount of the group payment, the dependent strategies and the group payment options. Preferably, the steps illustrated in FIGS. 8A and 8B can be overridden. For example, an operator could manually allocate a group payment between the key account and the dependent accounts in accordance with specific allocation instructions. The allocation instructions could be generated by the primary owner of the group or the issuer. If the group payment is an electronic payment, then instructions submitted with the electronic payment could determine how the payment is allocated. The allocation instructions could be for a single payment or could be standing instructions that apply to all payments received. If the allocation instructions are standing instructions, then the instructions could be stored in the group master data.

There are times when the application of a group payment needs to be reversed. For example, reversal of a payment is necessary if a check for the payment is returned for insufficient funds. If a check for a group payment is returned for insufficient funds, then the payment allocations to the accounts in the group are reversed. To reverse the payment allocations, the original payment allocation must be recreated. For example, if a group payment of $100 was allocated $50 to the key account, $25 to one dependent account and $25 to another dependent account, then reversal of the group payment is made by reversing the $50 payment allocation to the key account, the $25 payment allocation to the first dependent account and the $25 payment to the second dependent account. To reverse a payment, the Payment Allocation file is used to determine how the payment was originally allocated.

Generating Group Statements and Courtesy Statements

A group statement is created for the group and is sent to the primary owner. The group statement includes information about the activity of the key account (if any) and the activity of some or all of the dependent accounts of the group. The amount of information that appears on the group statement about a dependent account is controlled by the dependent strategy. Depending upon the dependent strategy, the group statement can include details of the activity of the dependent account or a summary of the activity of the dependent account.

Statement data is calculated for each account in the group. Statement data typically includes the MPD, LSB, reward information, finance charges, and late fees for the account. The statement data is calculated on an account by account basis. The statement data is used to create the group statement, a dependent statement, and/or a courtesy statement. The statement data is also used to calculate group data.

Group data includes the group MPD, group LSB, group reward information, group available credit, group finance charges and group late fees. The group data is calculated from the key account and any dependent accounts that are paid by the primary owner. The group statement also includes information about the previous group payment, including the amount, the posting date, etc. The group statement also includes information about the group, such as the primary owner, a listing of the accounts in the group, including the account numbers, and the dependent strategy for each dependent account in the group.

A dependent strategy specifies whether payment for the dependent account is due from the primary owner or from a dependent cardholder associated with the dependent account. The dependent strategy can also specify that a courtesy statement is generated. A courtesy statement is a statement that provides statement data to the cardholder, but does not require payment from the cardholder.

Figure 9:
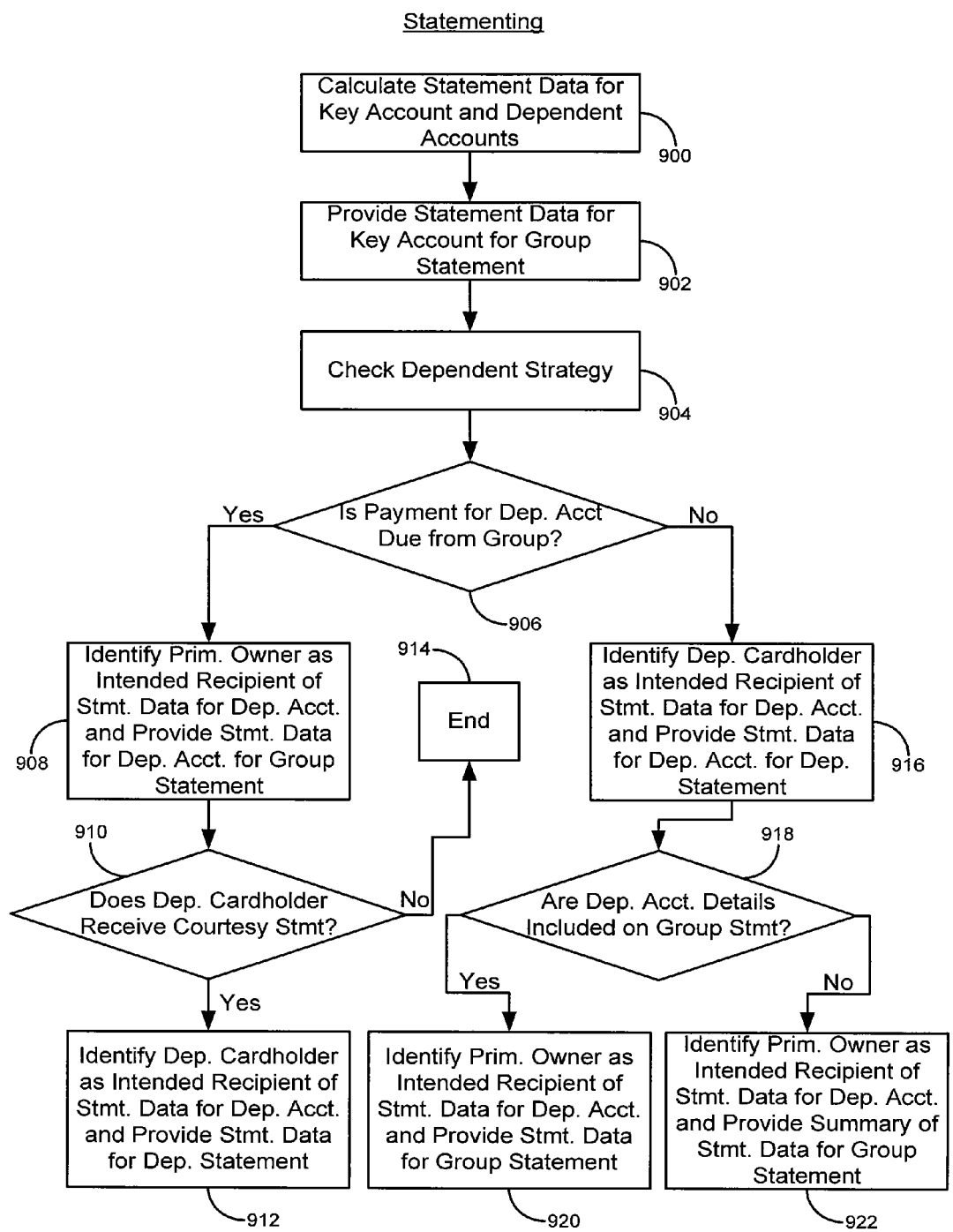
FIG. 9 is a flow diagram illustrating the steps for identifying intended recipients of statement data and providing statement data in accordance with an embodiment of the present invention.

FIG. 9 illustrates exemplary steps for identifying the addressees or intended recipients of statement data and for providing statement data for inclusion on the group statement, a dependent statement, and a courtesy statement. In step 900, statement data for the key account (if any) and the dependent accounts are calculated. If the group includes a key account, then the statement data for the key account is provided for the group statement in step 900. In step 904, the dependent strategy for a dependent account is checked to determine whether payment for the dependent account is due from the primary owner or from a dependent cardholder associated with the dependent account.

If payment for the dependent account is due from the primary owner, then the "Yes" branch is followed to step 908. In step 908, the primary owner of the group is identified as an intended recipient of the statement data for the dependent account and the statement data for the dependent account is provided for inclusion on the group statement. In step 910, a determination is made as to whether the dependent strategy specifies that the dependent cardholder receives a courtesy statement. If the dependent strategy specifies that the dependent cardholder receives a courtesy statement, then the "Yes" branch is followed to step 912. In step 912, the dependent cardholder is identified as another intended recipient of the statement data for the dependent account and the statement data for the dependent account is provided for inclusion on the dependent statement. If the determination in step 910 is that the dependent strategy does not specify that the dependent cardholder receives a courtesy statement, then the "No" branch is followed to step 914 and the method ends.

If payment for the dependent account is due from a dependent cardholder associated with the dependent account, then the "No" branch is followed to step 916. In step 916, the dependent cardholder of the group is identified as an intended recipient of the statement data for the dependent account and the statement data for the dependent account is provided for inclusion on a statement for the dependent cardholder. In step 918, a determination is made as to whether the dependent strategy specifies that the details of the activity of the dependent account are included on the group statement. If the details of the activity of the dependent account are included on the group statement, then the "Yes" branch is followed to step 920. In step 920, the primary owner is identified as another intended recipient of the statement data for the dependent account and the statement data for the dependent account is provided for inclusion on the group statement. If the dependent account statements on the same day as the group, then current statement data is provided for inclusion on the group statement. However, if the dependent account statements on a different day than the group, then statement data associated with the last dependent statement is provided for inclusion on the group statement.

If the determination in step 918 is that the details of the activity of the dependent account are not included on the group statement, then the "No" branch is followed to step 922. In step 922, the primary owner is identified as another intended recipient of the statement data for the dependent account and a summary of the statement data for the dependent account is provided for inclusion on the group statement.

Step 904 illustrates that the dependent strategy for a dependent account is checked. As will be apparent to those skilled in the art, if the group includes multiple dependent accounts, then steps 904 through 922 are repeated for each dependent account.

Cardholder Communications

The dependent strategy for a dependent account also provides cardholder communication options for the dependent account. The communication options specify the intended recipient of an original communication, such as a letter, notice, or plastic, and, in the case of letters or notices, specify whether a courtesy copy of the communication is provided. A communication is typically generated to provide information to the cardholder. For example, a communication can be generated to advise a cardholder of changes to the cardholder agreement or to advise a cardholder of special offers.

The dependent strategy can specify that the original communication is sent to the primary owner. The dependent strategy can also specify that a courtesy copy of the communication is sent to the dependent cardholder. Alternatively, the dependent strategy can specify that the original communication is sent to the dependent cardholder. If the dependent strategy specifies that the original communication is sent to the dependent cardholder, the dependent strategy can also specify that a courtesy copy of the communication is sent to the primary owner.

In some instances, it may be necessary to generate multiple courtesy copies. This situation may occur if two parties are jointly liable on an account. For example, a dependent account could be jointly held by a first dependent cardholder and a second dependent cardholder. If the dependent strategy specifies that the first dependent cardholder receives the original communication and that the primary owner receives a courtesy copy, then in addition to the courtesy copy sent to the primary owner, a second courtesy copy is sent to the second dependent cardholder because the account is jointly held.

If the group includes multiple dependent accounts, then the dependent strategies for the dependent accounts can specify that the primary owner is to receive the original communication or a courtesy copy. Preferably, it is recognized that multiple communications are being sent to the primary owner so that the communications can be merged into a single communication that includes the communications for all the dependent accounts.

A group communication can include information about some or all of the accounts within a group. Typically, a group communication is sent to the primary owner of the group. Information about selected accounts of the group is obtained from the financial records corresponding to the accounts. The type of information obtained from the financial records can vary according to the type of communication. Typically, the type of information is specified by a processing option or variable associated with the communication. The information obtained from the financial records is combined into a single communication. The single communication can be automatically generated.

A group communication can also be manually created. The group communication can include information about the accounts within the group. To manually create a group communication, an operator can use a series of on-line screens to specify the accounts and the type of information to be included in the communication.

In addition to letter communications, the primary owner and the dependent account cardholders may also receive notices. Notices are added to a group statement by considering what notices are required for the key account, what notices are required for each of the dependent accounts, and what notices are optional for the key account and the dependent accounts. If several accounts require the same notice, then preferably the notices are reviewed to insure that no duplicates are included.

Pooling Reward Points

Reward programs allow cardholders to earn reward points based on purchases and other account activity. The processing of reward points at the group level is determined by the reward program and the dependent strategies of the dependent accounts in the group. Typically, the availability of group level pooling is determined by the reward program. It may be that some programs permit group pooling, whereas other programs do not. If the accounts in a group are members of multiple reward programs, then it is possible that some programs permit pooling while other programs do not.

If a reward program supports pooling, then any reward points earned by the key account are pooled into the group pool. The dependent strategy specifies whether reward points earned by a dependent account are pooled or are maintained at the account level. In addition, the dependent strategy specifies whether the dependent account cardholder can redeem group reward points.

Figure 10:
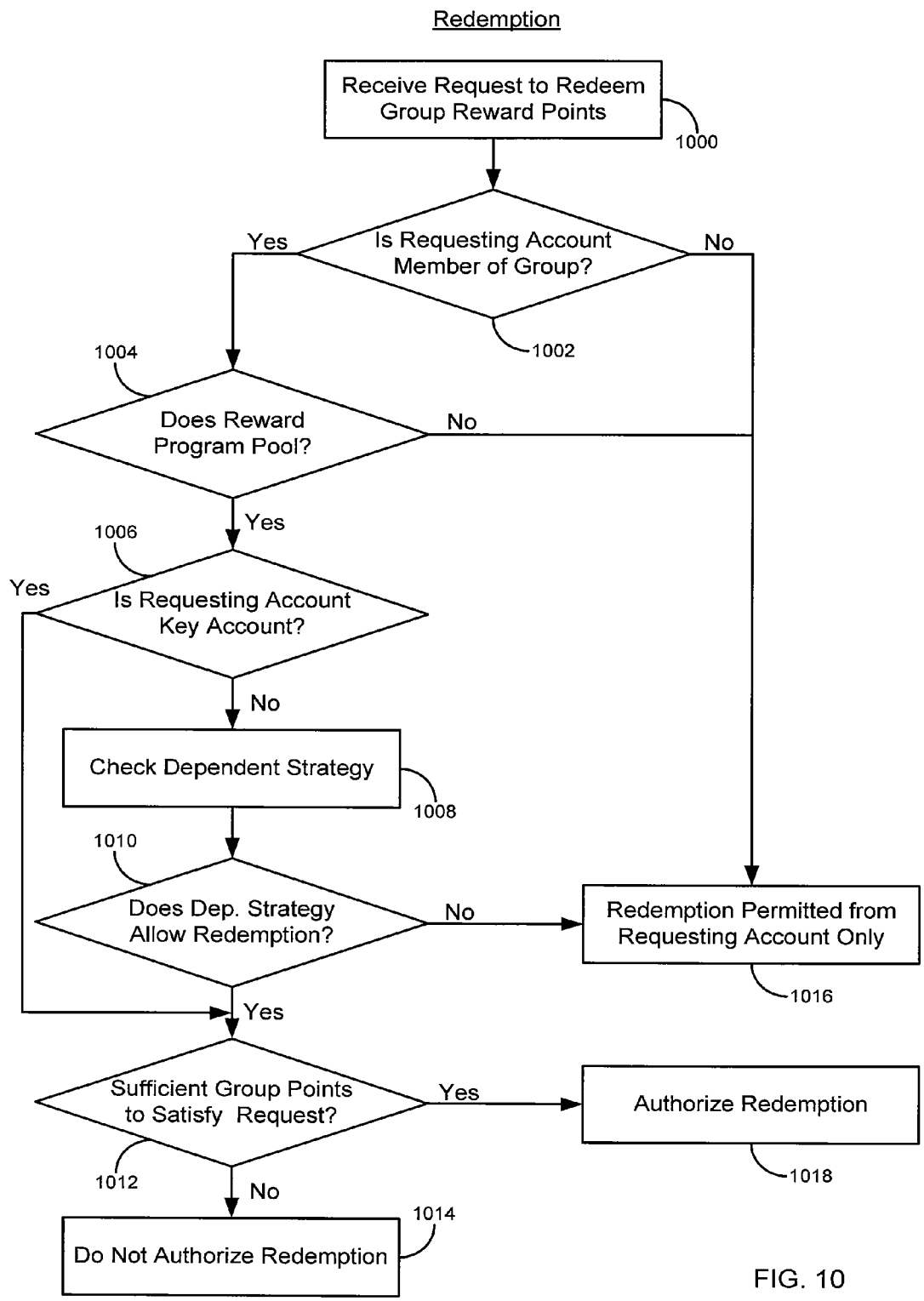
FIG. 10 is a flow diagram illustrating the steps for redeeming group reward points in accordance with an embodiment of the present invention.

An exemplary method for redeeming group reward points is shown in FIG. 10. In step 1000, a request to redeem group reward points is received. In step 1002, a determination is made as to whether the request is associated with an account that is a member of the group. If the request is from an account that is a member of the group, then the "Yes" branch is followed to step 1004. In step 1004, a determination is made as to whether the reward program supports pooling. If the reward program supports pooling, then the "Yes" branch is followed to step 1006. In step 1006, a determination is made as to whether the account making the request is the key account. If the requesting account is the key account, then the "Yes" branch is followed from step 1006 to step 1012. However, if the requesting account is not the key account, then the requesting account is a dependent account and the "No" branch is followed from step 1006 to step 1008. In step 1008, the dependent strategy for the requesting dependent account is checked. A determination is made in step 1010 as to whether the dependent strategy specifies that the dependent account can redeem group reward points. If the dependent account can redeem group reward points, then the "Yes" branch is followed to step 1012.

In step 1012, a determination is made as to whether there are sufficient group points to satisfy the redemption request. If there are sufficient points, then the "Yes" branch is followed to step 1018 and the request to redeem group reward points is authorized. However, if there are not sufficient points, then the "No" branch is followed to step 1014 and the redemption request is not authorized.

If the determination in step 1002 is that the request to redeem group reward points is made by an account that is not a member of a group or the determination in step 1004 is that the reward program does not support reward point pooling, then the method proceeds to step 1016. Likewise, if the determination in 1010 is that the dependent account strategy does not allow the redemption of group reward points, then the method proceeds to step 1016. In step 1016 the requesting account is permitted to redeem points that are associated with the requesting account, but is not permitted to redeem group points.

As an alternative to reward point pooling, reward points can be shared between the accounts of a group via chasing. If chasing is implemented, then reward points earned by an account remain at the account level. The points can be chased or collected from the account level and used to satisfy a single redemption request.

Preferably, chasing is enabled or disabled by the reward program. If chasing is enabled by the reward program, then the accounts that participate in the reward program can support chasing. If an account supports chasing, then the account permits another account to redeem its earned reward points. If the account is a key account, then the option to support chasing could be part of the predefined relationship between the key account and the group. If the account is a dependent account, then the option to support chasing could be part of the dependent strategy. The ability to chase reward points could expand beyond the group to accounts that are not members of the group.

If a cardholder makes a redemption request that exceeds the reward points associated with the cardholder's account, then a determination is made as to whether the reward program supports chasing. If the reward program supports chasing, then the accounts that permit chasing in that reward program are identified. Points are chased from the identified accounts to satisfy the redemption request. The points are chased from the accounts based on a chasing option that specifies how the points are chased from the identified account. The chasing option could specify that the points are chased from the accounts on a pro rata basis, on the basis of an account hierarchy, or on some other basis. Chasing could be performed by an operator pursuant to instructions received by a cardholder. If chasing is performed by an operator, then the accounts that support chasing are displayed and the operator can select the accounts to chase. The operator can also determine the number of points chased from each account.

Group Non-Monetary Transactions

In addition to group monetary transactions, such as authorizing a transaction or allocating a payment, group non-monetary transactions are also needed to support groups. A non-monetary transaction is a transaction that affects information for one or more accounts within the group, but does not affect the monetary information for the account. For example, a change in billing address is a non-monetary transaction, whereas the application of a payment is a monetary transaction. Other examples of non-monetary transactions include linking an account to an existing group, delinking one or more accounts from a group, changing the primary owner of a group, or changing the dependent strategy for a dependent account.

Group non-monetary transactions can be used in both batch and on-line processing. Group non-monetary transactions update multiple accounts within a group in response to a single input of the updated information. To update the accounts in a group with updated group information, the accounts within the group are identified. The accounts are identified using the group master data. As described in connection with FIG. 4B, the accounts in a group can be identified using the Group Member file. Once the financial records are identified, then the financial records are updated with the new information.

Group non-monetary transactions also support the selective updating of accounts within the group. For example, if only certain accounts within the group are to receive the updated information, then the accounts in the group are identified and one or more of the accounts is selected and the selected account(s) is updated with the new information. In an on-line environment, an operator can select the accounts that are to receive the updated information. In a batch environment, the updated information and the account numbers for the selected accounts can be submitted in batch.

CONCLUSION

The present invention is directed to a method for linking accounts corresponding to different products together to create a group so that group processing can be performed at the group level while independent processing of the accounts is performed at the account level. The method links the accounts into a group by linking a financial record for each account to group master data for the group. The group master data includes information about the group, including group control settings, aggregate data, and a group identifier. A group typically includes a key account and one or more dependent accounts. The relationship between a dependent account and the group is specified by a dependent strategy. A dependent strategy specifies group level processing options for the account. The relationships between the accounts and the group are flexible to accommodate changes in the status of the group cardholders.

Alternative embodiments will be apparent to those skilled in the art to which the present invention pertains without departing from its spirit and scope. Accordingly, the scope of the present invention is described by the appended claims and is supported by the foregoing description.

What is claimed is:

1. A method for defining relationships between accounts and a group to facilitate group processing while maintaining independent processing of the accounts, wherein the group includes a first account corresponding to a first product and a second account corresponding to second product, the method comprising:
   providing parameters that correspond to group processing options;
   defining a first relationship between the first account and the group by selecting values for the parameters to define a first set of group processing options; and
   defining a second relationship between the second account and the group by selecting values for the parameters to define a second set of group processing options that is independent of the first set of group processing options.

2. The method of claim 1, further comprising the steps of:
   grouping the first set of group processing options together; and
   labeling the first set of group processing options as a dependent strategy.

3. The method of claim 2, further comprising the step of:
   maintaining a strategy history for the dependent strategy, wherein the strategy history includes any changes in the group processing options associated with the strategy.

4. The method of claim 1, further comprising the step of:
   modifying the first relationship by modifying the first set of group processing options while maintaining the second relationship.

5. The method of claim 1, wherein the parameters include an authorization option.

6. The method of claim 1, wherein the parameters identify a liable party.

7. The method of claim 1, wherein the parameters include a cardholder communication option.

8. The method of claim 1, wherein the parameters include a reward pooling option.

9. The method of claim 1, wherein a primary owner is associated with the group and a first cardholder is associated with the first account, comprising the step of:
   modifying ownership of the group so that the first cardholder is a new primary owner by changing a relationship parameter value for the first account from dependent to key.

10. The method of claim 1, further comprising the step of:
    maintaining account history for the accounts in the group, wherein the account history for each account includes any changes in the group processing options associated with the account and any changes in the account's membership in the group.

11. A method for creating a dependent strategy to customize a relationship between a dependent account and a group, the method comprising:
    selecting a set of parameters from a plurality of parameters;
    defining values for the set of parameters to define group processing options;
    labeling the set of parameters and the values for the set of parameters as the dependent strategy; and
    associating the dependent strategy with the dependent account to customize the relationship between the dependent account and the group, wherein the group includes at least the dependent account and another account, and wherein and the other account is processed independent from the dependent account.

12. The method of claim 11, further comprising the step of:
    modifying the dependent strategy by:
        selecting a parameter from the set of parameters; and
        modifying the value of the selected parameter.

13. The method of claim 11, wherein the dependent strategy is associated with a plurality of dependent accounts that are associated with a plurality of groups, further comprising the steps of:
    modifying the dependent strategy by:
        selecting a parameter from the set of parameters; and
        modifying the value for the selected parameter so that the relationships between the dependent accounts associated with the dependent strategy and the groups are modified.

14. The method of claim 11, further comprising the step of:
    defining a second set of values for the set of parameters;
    labeling the set of parameters and the second set of values as a second dependent strategy; and
    associating the second dependent strategy with a second dependent account to customize the relationship between the second dependent account and the group.

15. The method of claim 14, further comprising the steps of:
    changing the relationship between the dependent account and the group by:
    associating the second dependent strategy with the dependent account to change the relationship between the dependent account and the group while maintaining the relationship between the second dependent account and the group.

16. A method for defining relationships between accounts in a group to facilitate group level processing while maintaining independent processing of the accounts, comprising the steps of:
    providing a plurality of dependent strategies, each dependent strategy defining a customized relationship to the group;
    associating a first dependent strategy with a first account to define the relationship between the first account and the group; and
    associating a second dependent strategy with a second account to define the relationship between the second account and the group.

17. The method of claim 16, further comprising the steps of:
    changing the relationship between the first account and the group by associating a different dependent strategy with the first account so that the relationship between the first account and the group is changed while maintaining the relationship between the second account and the group.

18. The method of claim 16, wherein a primary owner is associated with the group, and wherein the first dependent strategy specifies that a first cardholder associated with the first account is jointly liable for the group.

19. A method for maturing a dependent account that is a member of a group into a key account for a second group, comprising the steps of:
    selecting the dependent account; and
    modifying a relationship parameter that defines the dependent account's relationship to the group from dependent to key, so that the dependent account is matured into the key account for the second group and a dependent cardholder associated with the dependent account is matured into a primary owner of the second group.

20. The method of claim 19, further comprising the step of:
    maintaining account history for the dependent account by associating the account history with the key account for the second group.

21. The method of claim 19, wherein the group includes a plurality of dependent accounts, further comprising the steps of:
    selecting a set of dependent accounts;
    moving the set of dependent accounts to the second group; and
    maintaining account histories for the set of dependent accounts.

22. A method for maturing a dependent account into a key account for a group, the group including the dependent account and an original key account that corresponds to an original primary owner, wherein the original key account is distinct from the dependent account, the method comprising:
    selecting the dependent account;
    modifying a relationship parameter that defines the dependent account's relationship to the group from dependent to key, so that the dependent account is matured into the key account and a dependent cardholder associated with the dependent account is matured into a primary owner of the group; and
    modifying a relationship parameter that defines the original key account's relationship to the group from key to dependent, so that the original key account is changed to a second dependent account and the original primary owner is changed to a second dependent cardholder.

* * * * *